United States Patent
Al Afnan et al.

(10) Patent No.: US 11,168,552 B2
(45) Date of Patent: Nov. 9, 2021

(54) METHOD FOR NATURAL GAS RECOVERY FROM SUBTERRANEAN HYDROCARBON RESERVOIRS

(71) Applicant: King Fahd University of Petroleum and Minerals, Dhahran (SA)

(72) Inventors: Saad Al Afnan, Dhahran (SA); Murtada Al Jawad, Dhahran (SA); Fahad Al-Ismail, Dhahran (SA); Abdulaziz Al Majed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 63 days.

(21) Appl. No.: 16/665,685

(22) Filed: Oct. 28, 2019

(65) Prior Publication Data
US 2021/0123332 A1 Apr. 29, 2021

(51) Int. Cl.
*E21B 43/24* (2006.01)
*E21B 47/06* (2012.01)
(Continued)

(52) U.S. Cl.
CPC .......... *E21B 43/2401* (2013.01); *E21B 47/06* (2013.01); *E21B 47/07* (2020.05);
(Continued)

(58) Field of Classification Search
CPC .......... E21B 36/00; E21B 36/04; E21B 36/02; E21B 36/006; E21B 36/005; E21B 47/017; E21B 27/00; E21B 41/00; F26B 21/083
See application file for complete search history.

(56) References Cited

U.S. PATENT DOCUMENTS

| 2,781,851 A | * | 2/1957 | Smith ..................... E21B 36/04 |
| | | | 166/60 |
| 3,342,267 A | * | 9/1967 | Cotter ................. E21B 41/0085 |
| | | | 166/60 |

(Continued)

FOREIGN PATENT DOCUMENTS

| CN | 101469608 A | 7/2009 |
| CN | 101435328 B | 7/2012 |
| CN | 106499376 A | 3/2017 |

OTHER PUBLICATIONS

Li, et al.; Use of Electrical Heating to Remove Condensate Banking in the Near-Wellbore Region of Shale Condensate Reservoirs; Future Energy Systems; 2019; 4 Pages.

*Primary Examiner* — Brad Harcourt
(74) *Attorney, Agent, or Firm* — Oblon, McClelland, Maier & Neustadt, L.L.P.

(57) ABSTRACT

A method of improving natural gas recovery from a subterranean hydrocarbon reservoir includes at least one renewable energy source that is electrically coupled with a heat conducting element. The heat conducting element is positioned in a perforated section of a wellbore that traverses into the subterranean hydrocarbon reservoir. A temperature of the subterranean hydrocarbon reservoir is maintained above a cricondentherm temperature so that liquid condensation may be prevented at a final production time. In order to maintain the temperature within a required temperature range, an internal temperature, an internal pressure, and a set of reservoir properties are monitored and then utilized to plot a phase diagram that can be used to detect liquid condensation. If liquid condensation is detected, an electrical output of the renewable energy source is adjusted in order to control the temperature of the subterranean hydrocarbon reservoir at a producing end of a production tubing.

9 Claims, 18 Drawing Sheets

(51) Int. Cl.
*H05B 6/04* (2006.01)
*H05B 6/10* (2006.01)
*H02S 99/00* (2014.01)
*H02S 10/12* (2014.01)
*E21B 47/07* (2012.01)

(52) U.S. Cl.
CPC .............. *H02S 10/12* (2014.12); *H02S 99/00* (2013.01); *H05B 6/04* (2013.01); *H05B 6/10* (2013.01); *H05B 2206/022* (2013.01)

(56) References Cited

U.S. PATENT DOCUMENTS 10,053,959 B2    8/2018  Ayub et al.
2016/0326839 A1 * 11/2016  Ayub ...................... E21B 36/04

* cited by examiner

METHOD FOR NATURAL GAS RECOVERY FROM SUBTERRANEAN HYDROCARBON RESERVOIRS

BACKGROUND

Field of the Invention

The present disclosure relates to methods of recovering natural gas from subterranean hydrocarbon reservoirs. In particular, the present disclosure describes a method of using renewable energy as a source of downhole heating such that liquid condensation may be prevented and natural gas recovery may be improved.

Description of the Related Art

Gas condensate is a hydrocarbon liquid stream separated from natural gas and includes higher-molecular-weight hydrocarbons that exist in the reservoir as constituents of natural gas but which are recovered as liquids in separators, field facilities, or gas-processing plants. Moreover, gas condensate is distinguished by the fluid behavior when liquid and gas phases coexist as the reservoir pressure drops below a dew point. The retrograde behavior, which is a result of multicomponent hydrocarbon molecular interactions, is unfavorable in the overall natural gas recovery process. As a result of the fluid behavior, liquid tends to accumulate around the wellbore and significantly reduce the reservoir deliverability.

According to recent statistical reviews, natural gas reservoirs including gas condensates supply more than a quarter of the global demand of energy. Natural gas (also called fossil gas) is a naturally occurring hydrocarbon gas mixture entailing primarily of methane, but commonly including varying amounts of other higher alkanes, and sometimes a small percentage of carbon dioxide, nitrogen, hydrogen sulfide, or helium. The composition of the natural gas dictates the behavior during the production process. Based upon the fractions of lighter hydrocarbons, gas reservoirs are categorized into three groups. Namely, dry, wet, and gas condensate. Among the three groups, gas condensate has the highest fraction of larger alkanes. Gas condensate is produced as gas in the early stages of production and eventually liquid drops out as the pressure declines below the dew point. The liquid accumulation can reach a threshold and restrict the gas inflow and thus, minimize the productivity of the well. The typical phase diagram of gas condensation is shown in FIG. 1.

Gas condensate reservoir performance is closely tied to the phase behavior which is determined by the chemical compositions, wherein the chemical compositions are determined through experimental and analytical methods. See Tu, H.; Guo, P.; Jia, N.; Wang, Z. Numerical evaluation of phase behavior properties for gas condensate under non-equilibrium conditions. Fuel 2018, 226, 675-685; and Thomas, F. B., Bennion, D. B., & Andersen, G. (2009, Jul. 1). Gas Condensate Reservoir Performance. Petroleum Society of Canada. doi:10.2118/09-07-18, each incorporated herein by reference in their entirety. The extent of liquid accumulation is governed by the reservoir pressure, rock permeability, and the fractions of heavy hydrocarbons. See Mott, R. (2003, Oct. 1). Engineering Calculations of Gas-Condensate-Well Productivity. Society of Petroleum Engineers. doi:10.2118/86298-PA; Raghavan, R., & Jones, J. R. (1996, Aug. 1). Depletion Performance of Gas-Condensate Reservoirs. Society of Petroleum Engineers. doi:10.2118/36352-JPT; and Fevang, Ø., & Whitson, C. H. (1996, Nov. 1). Modeling Gas-Condensate Well Deliverability. Society of Petroleum Engineers. doi:10.2118/30714-PA, each incorporated herein by reference in their entirety. The pressure profile is lowest at the wellbore and increases with distance to a maximum value at the boundary. As a result, three distinguished regions of condensate accumulations are created. See Fevang, Ø., Whitson, C. H., 1995. Modeling gas-condensate well deliverability, SPE 30714, incorporated herein by reference in its entirety. In a first region, which is close to the wellbore, the liquid is mobile and hence, significantly reduces the gas relative permeability of the formation. A second region of the three regions is below the dew point. However, since the liquid content is insufficient within the second region, a flow is not detected. A third region is partially above the dew point and only a single phase gas is present. On average, the recovery factor of gas condensate is less than 50% worldwide and can even be low as 10% in some severe cases of liquid accumulation when attempts to restore productivity are not successful. See Afidick, D.; Kaczorowski, N. J.; Bette, S. Production Performance of a Retrograde Gas Reservoir: A Case Study of the Arun Field. SPE 28749, Presented at SPE Asia Pacific Oil and Gas Conference, Melbourne, Australia, 1994; and Al-Anazi, H. A.; Pope, G. A.; Sharma, M. M. Laboratory measurement of condensate blocking and treatment for both low and high permeability rocks. SPE Annual Technical Conference and Exhibition, 2005, each incorporated herein by reference in their entirety.

Maintaining a wellbore pressure above the dew point can prevent the formation of a liquid bank. However, doing so imposes constraints over the ultimate recovery process. Alternatively, a large pressure drawdown can be implemented with remedial procedures that are applied to enhance the well deliverability in continuous shut-in reproduction cycles. The remedial procedures can be chemical or mechanical. The chemical procedures can be divided into two groups, wherein a first group relies on shifting the interfacial tension to enhance the relative permeability of gas by injecting weak acidizing organic solvents such as methanol. See Al-Anazi, H. A.; Walker, J. G.; Pope, G. A.; Sharma, M. M.; Hackney, D. F. A successful methanol treatment in a gas-condensate reservoir: field application. SPE Production and Operations Symposium, 2003; Chen, J., Hirasaki, G., Flaum, M., 2004. Study of wettability alteration from NMR: effect of OBM on wettability and NMR responses, Eighth International Symposium on Reservoir Wettability, each incorporated herein by reference in their entirety. The effectiveness of chemical solvents is strongly related to the type of the rock, the reservoir heterogeneity, and methanol post-treatment residual saturation. See Walker, J. G., 2000. Laboratory Evaluation of Alcohols and Surfactants to Increase Production from Gas-Condensate Reservoir. The University of Texas at Austin, Austin, Tex., MS Thesis; and Du, L., Walker, J. G., Pope, G. A., Sharma, M. M., Wang, P., 2000. Use of solvents to improve the productivity of gas condensate wells, SPE 62935, each incorporated herein by reference in their entirety. The methanol post-treatment residual saturation would control the long term effect of methanol injection on the reformation of the condensate bank. A second group, which is determined according to the chemical procedures, relies on the principle of increasing the temperature of the accumulated liquid above a respective vapor phase, wherein the temperature is increased using exothermic reactions. See Amjed M. Hassan, Mohamed A. Mahmoud, Abdulaziz A. Al-Majed, Salaheldin Elkatatny, Ayman R. Al-Nakhli, and Mohammed A.

Bataweel; Novel Technique to Eliminate Gas Condensation in Gas Condensate Reservoirs Using Thermochemical Fluids, Energy & Fuels 2018 32 (12), 12843-12850 DOI: 10.1021/acs.energyfuels.8b03604, incorporated herein by reference in its entirety. Another strategy used for gas condensate related issues is to hydraulically fracture the formation beyond the liquid bank such that an increase in productivity can be obtained temporarily. However, condensation will occur eventually and accumulate around the fractured zone. See Sayed, M. A.; Al-Muntasheri, G. A. Mitigation of the effects of condensate banking: a critical review. SPE Prod. Oper. 2016, 31, 085-102; Settari, A., Bachman, R. C., Hovem, K., Paulson, S. G., 1996. Productivity of fractured gas condensate wells—a case study of Smorbukk field, SPE 35604; each incorporated herein by reference in their entirety. Carbon dioxide injection has also been investigated to improve the recovery of gas condensate. In particular, increasing the fraction of carbon dioxide in the reservoir fluid can change the pressure-volume-temperature (PVT) behavior of the fluid. By doing so, a phase envelope, which is a two phase region bounded by the bubble point and the dew point curves, can be reduced. See Yuan, C.; Zhang, Z.; Liu, K. Assessment of the recovery and front contrast of CO2 EOR and sequestration in a new gas condensate reservoir by compositional simulation and seismic modeling. Fuel 2015, 142, 81-86; Su, Z.; Tang, Y.; Ruan, H.; Wang, Y.; Wei, X. Experimental and modeling study of CO2—Improved gas recovery in gas condensate reservoir. Petroleum 2017, 3, 87-95; Kossack, C. A., Opdal, S. T., 1986. Recovery of condensate from a heterogeneous reservoir by injection of a slug of methane followed by nitrogen, SPE 18265; and Sanger, P., Hagoort, J., 1998. Recovery of gas condensate by nitrogen injection compared with methane injection. SPEJ, 26-33, each incorporated herein by reference in their entirety. Even though injecting carbon dioxide can be effective, the procedure may require a large capital investment and close monitoring of operational managements. The aforementioned procedures are mainly focused on repair after damage has occurred. Moreover, these procedures are applied throughout the life time of a reservoir until production from the reservoir or further treating the reservoir are unfeasible.

Several heating methods for fossil fuel recovery have been developed. A simplified approach is the in-situ conversion process (ICP), where the heat transfers through a conducting element that is placed in the ground and supplied directly by an electric power source. See J. E. Bridges, "Wind Power Energy Storage for In Situ Shale Oil Recovery With Minimal CO2 Emissions," *IEEE Trans. Energy Convers.*, vol. 22, no. 1, pp. 103-109, 2007, incorporated herein by reference in its entirety.

In view of the difficulties and drawbacks of the existing procedures to improve subterranean hydrocarbon reservoir performance, it is an object of the present disclosure to provide a permanent proactive solution rather than a reactive solution. The method of the present disclosure includes a minimal interference remedy. In particular, the present disclosure includes a method of heat-assisted production of condensate reservoirs especially as it relates to using renewable energy for the heat source.

SUMMARY OF THE INVENTION

The present disclosure describes a method that may be used to improve the natural gas recovery from subterranean hydrocarbon reservoirs by using renewable energy sources. In particular, the method of the present disclosure describes a method of preventing liquid condensation, which generally hinders the productivity of a subterranean hydrocarbon reservoir, by providing heat generated using renewable energy sources. A heat conducting element, which is electrically coupled with a renewable energy source, is positioned in a perforated section within a wellbore that traverses into a subterranean hydrocarbon reservoir. Thus, the energy generated from the renewable energy source is emitted to the subterranean hydrocarbon reservoir as heat via the heat conducting element. The heat emitted from the heat conducting element can be controlled by manipulating a set of electrical properties of the renewable energy source. An internal reservoir pressure and an internal reservoir temperature, along with a set of reservoir properties of the subterranean hydrocarbon reservoir are monitored in order to detect liquid condensation. The properties of the renewable energy source are adjusted such that liquid condensation is prevented at the wellbore. The renewable energy source can be, but is not limited to, solar energy and wind energy.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

All illustrations of the drawings are for the purpose of describing selected embodiments of the present disclosure and are not intended to limit the scope of the present disclosure or accompanying claims.

The present disclosure describes using renewable energy resources, primarily solar energy, to provide the energy that generates heat during a natural gas recovery process. The heat is utilized to avoid liquid condensation that can hinder the productivity of a subterranean hydrocarbon reservoir.

Figure 1:
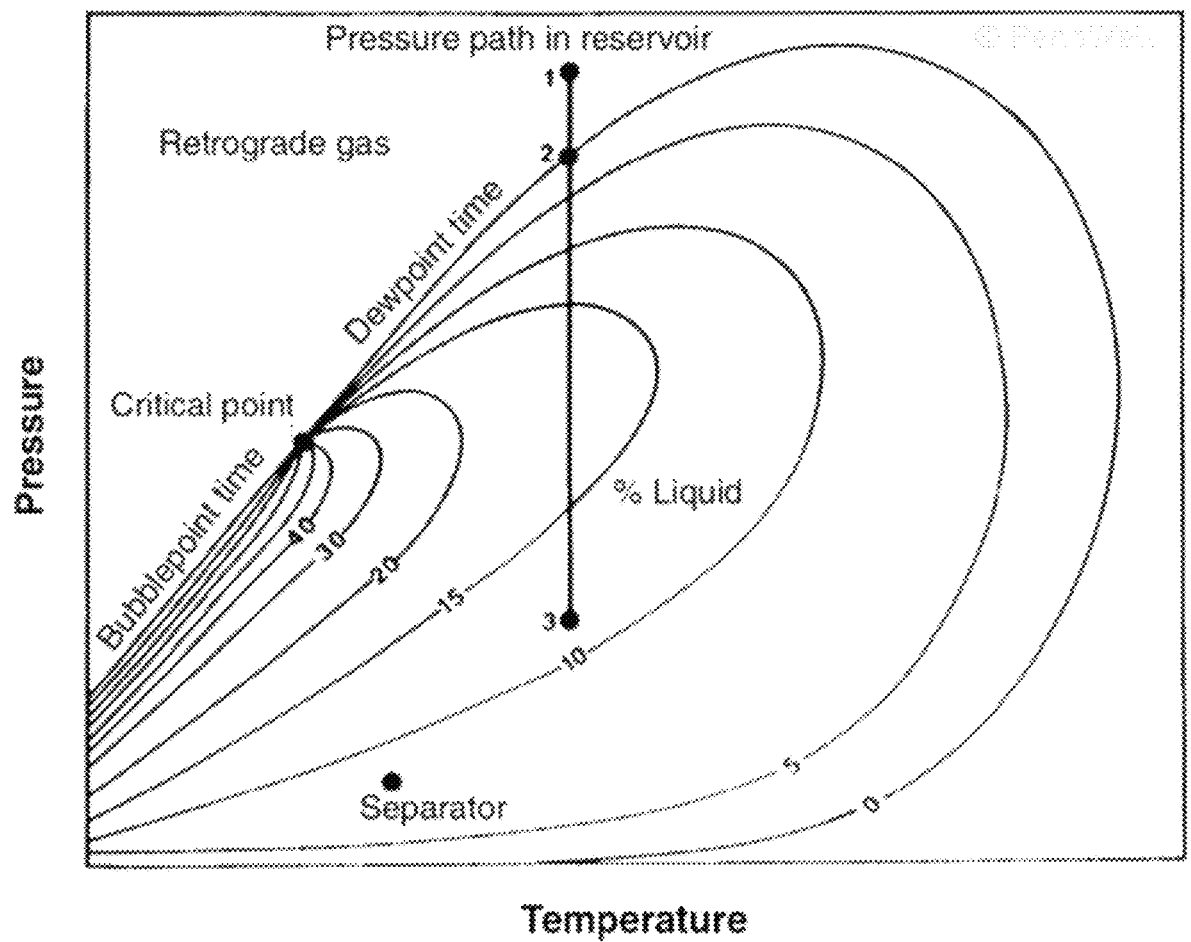
FIG. 1 is a gas condensate phase diagram.

When considering the phase diagram of condensate fluid as in FIG. 1, liquid drop out can be avoided at higher temperatures and can also be completely eliminated above a cricondentherm of the hydrocarbon mixture present in the formation, where the cricondentherm is the maximum temperature above at which a liquid cannot form. The range of high temperature is generally above the geothermal gradient, wherein the geothermal gradient is the amount that the temperature of the earth increases with depth. The geothermal gradient indicates heat flowing from a warm interior surface of the earth to the surface. On average, the temperature increases by a temperature within a range of 20 Centigrade (° C.)-30° C. for every kilometer of depth.

In regards to applying high temperatures, downhole electrical heaters (DHEH) have shown some success in enhancing the productivity of heavy oil reservoirs. See Bottazzi, F., Repetto, C., Tita, E., & Maugeri, G. (2013, Mar. 26). Downhole Electrical Heating for Heavy Oil Enhanced Recovery: A Successful Application in Offshore Congo. International Petroleum Technology Conference. doi: 10.2523/IPTC-16858-Abstract; and Carpenter, C. (2014, Mar. 1). Downhole Electrical Heating for Enhanced Heavy-Oil Recovery. Society of Petroleum Engineers. doi:10.2118/0314-0132-JPT, each incorporated herein by reference in their entirety. In particular, DHEH is a technique where a heat source is placed downhole to increase the near wellbore temperature, which in turn increases the mobility of heavy oils. In a preferred embodiment of the method of the present disclosure, an area around the wellbore with a radius within a range of 5 feet (ft)-10 ft is considered, with a preferable radius of 6 ft. A similar approach can be applied to gas condensates to a range where liquid drop out is eliminated.

In in-situ conversion processes (ICP), heat is carried through a thermal conducting material that is placed within a vertical borehole drilled into a hydrocarbon reservoir. When an alternating current (AC) passes through the heaters, an internal temperature of the reservoir will rise. Thus, the recovery of hydrocarbons is improved. At a center point of the heaters, a well area will be designated to receive products from the heated region. When using an alternating current for the purpose of heating a hydrocarbon-containing geological formation, a surface to volume ratio of the heated region needs to be minimal to reduce heat losses to adjacent formations. See G. McQueen, D. Parman, and H. Williams, "Enhanced oil recovery of shallow wells with heavy oil: A case study in electro thermal heating of California oil wells," 2009 Rec. Conf. Pap. —Ind. Appl. Soc. 56th Annu. Pet. Chem. Ind. Conf. PCIC 2009, 2009, incorporated herein by reference in its entirety.

Figure 4:
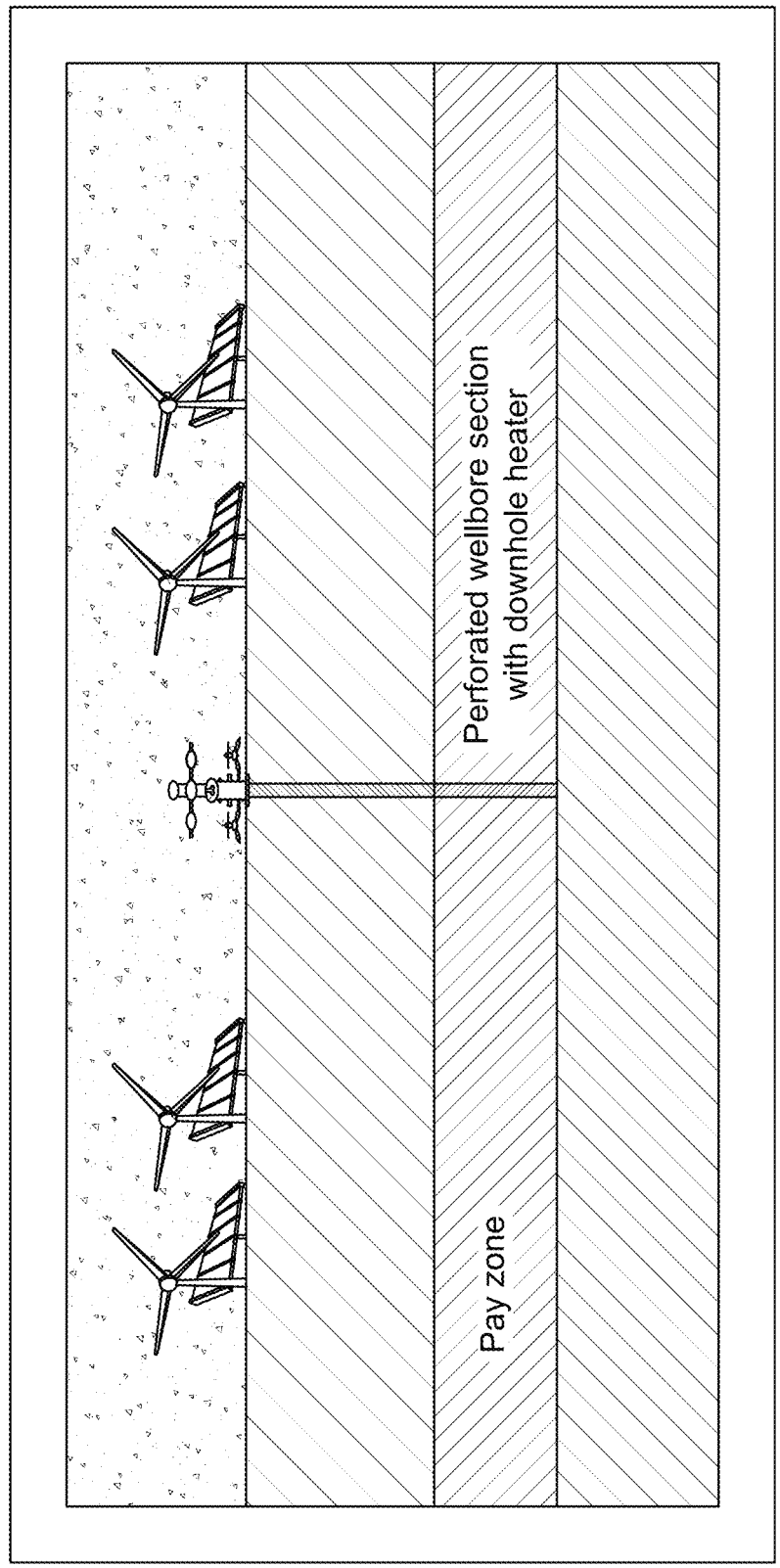
FIG. 4 is an illustration of a subterranean hydrocarbon reservoir heating system, wherein at least one renewable energy source is used to provide energy to a downhole electrical heater (DHEH).

As seen in FIG. 4, the method of the present disclosure for eliminating liquid accumulation during production of gaseous hydrocarbon from a hydrocarbon-containing geological formation is preferably implemented with a conceptual reservoir model that comprises a vertical wellbore, wherein the heat conducting element is positioned in a perforated section of the vertical wellbore. In particular, the conceptual reservoir model allows a dynamic study of heating during a production process. The subterranean hydrocarbon reservoir is initially above a dew point with no flow conditions assumed at the reservoir boundaries. A wellbore pressure is set to a low value to create a gradient for gas flow. At a final production time, where an internal pressure, an internal temperature, and a set of reservoir properties converge, a measured wellbore pressure value is approximately half of an initial wellbore pressure value. In addition to the convergence of the internal pressure, the internal temperature, and the set of reservoir properties, at the final production time, a production rate for the subterranean hydrocarbon reservoir matches a predetermined production rate and liquid condensation is prevented. Both the measured downhole pressure value, which represents a final pressure value, and the initial downhole pressure value are measured within the wellbore. For purposes of demonstration, production/flow results related to liquid condensation were obtained when a heating source was used and also when a heating source was not used.

As described earlier, the present disclosure describes a method of utilizing renewable energy sources for heating purposes during a natural gas recovery process. To do so, a heat conducting element is electrically coupled with at least one renewable energy source such that electrical energy can be converted into thermal energy. Thus, the energy generated by the renewable energy source can be transferred into the subterranean hydrocarbon reservoir as heat through the heat conducting element. To effectively transfer heat into the subterranean hydrocarbon reservoir, the heat conducting element is positioned in a perforated section of a wellbore. In a preferred embodiment, the heat conducting element is a metal section that can transfer heat into the subterranean hydrocarbon reservoir through convection and conduction. The metal section can be made of, but is not limited to, copper, aluminum, brass or bronze. In particular, a metal with a high thermal conductivity value is preferably used as the heat conducting element. Preferably, the heat conducting element is a portion of iron-based wellbore pipe, e.g., coiled tubing. The wellbore is in fluid communication with the subterranean hydrocarbon reservoir. Thus, the natural gas recovery process may be improved due to the heat transferred into the subterranean hydrocarbon reservoir via the heat conducting element that is positioned in the perforated section of the wellbore.

In one embodiment, the heat conducting element can be an induction heating cable, where an outer sheath of the induction heating cable is made with steel or high temperature fluoroplastic. The induction heating cable is preferably spliced to allow concentrated heating and to ensure heating is applied to a specific area while protecting the wellbore. Furthermore, the induction heating cable is preferably designed to lower overall operational costs. Preferably, the induction heating cable will include a copper core that is sleeved by a high grade insulation material. The insulation material can be, but is not limited to, crosslinked polyethylene, silicone rubber, ethylene-propylene elastomers, and thermoplastic elastomers. Both the copper core and the high grade insulation will be sleeved by a fiberglass protection. Preferably, a steel armor layer will be used as an outermost layer such that the fiberglass protection, the high grade insulation, and the copper core are all sleeved by the steel armor.

In another embodiment, a current transformer may be used as the heat conducting element such that a primary winding of the current transformer can be positioned within a casing at the bottom of the wellbore, wherein a current transformer is a transformer type that is used to reduce or multiply the alternating current. In particular, a secondary winding of the current transformer produces a proportional electrical current that is proportional to the electrical current applied to the primary winding. A section of the casing functions as a single turn secondary winding that is positioned adjacent the producing end. Therefore, large induced currents resistively heat the steel of the casing, and heat is transferred to the formation by thermal conduction. By increasing the frequency of the current at the primary winding, the rate of heating can be proportionately increased. In a different embodiment, the casing, or a section thereof, may be resistively heated by the flow of large currents in the casing itself. The adjacent formation is heated by thermal conduction from the secondary winding. In particular, the secondary winding is in thermal communication with the subterranean hydrocarbon reservoir. In both inductive heating and resistive heating, the frequency used is generally within a frequency range of 55 Hertz (Hz)-65 Hz, with a preferable frequency of 60 Hz. However, if required, higher frequencies can also be utilized.

In a different embodiment, heat can be emitted into the hydrocarbon reservoir through electromagnetic heating. To do so, relative motion is created between one or more magnets and a conducting surface, wherein the conducting surface is the heat conducting element that is magnetically coupled with at least one magnet. The relative motion, which changes a magnetic field applied to the conducting surface, will induce eddy currents on the conducting surface. A resistance of the conducting surface will generate heat that is dissipated into the subterranean hydrocarbon reservoir. In one embodiment, in order to induce eddy currents in the heat conducting element, the one or more magnets can be moved in a linear direction with respect to the heat conducting element. In another embodiment, in order to induce eddy currents in the heat conducting element, either the heat conducting element or the one or more magnets may be rotated relative to each other. The heat conducting element and/or the one or more permanent magnets may be coupled to a pump, positioned within the wellbore, such that the reciprocating motion of the pump causes the heat conducting element and/or the one or more permanent magnets to move in a linear direction with respect each other. A drive mechanism may be coupled to the pump, wherein the drive mechanism translates the linear motion of the pump into rotational movement of the heat conducting element or the magnets. In a different embodiment, when the one or more permanent magnets is a plurality of permanent magnets, the plurality of permanent magnets can be placed in a cylindrical or linear arrangement having alternately placed north-south poles. The one or more permanent magnets may be placed in a linear or cylindrical Halbach array, wherein the Halbach array is a special arrangement of permanent magnets that augments the magnetic field on one side of the array while cancelling the field to near zero on the other side which is achieved by having a spatially rotating pattern of magnetization.

In a different embodiment, the heat conducting element may include one or more electric heating cables, an elongated support member attached to the heating cables, wherein the elongated support member receives a mechanical load from the heating cables, and a cable hang-off configured to vertically suspend the heating cables and the support member. The cable hang-off can have a shell through which the heating cables and the support member are disposed, the shell having a bowl, and a plurality of slips that cooperate with each other and with the bowl to form a pinching member that grips and suspends the support member. The heating cables can be mineral insulated cables. The support member can be a wire rope attached to the heating cables at regular intervals with a cable support clamp. The cable support clamp can include at least one clamp body having a cable cavity for each heating cable and a rope cavity. The shell can have a cylindrical mount that receives an end of a length of the heat conducting element, and the heating cables and support member can be disposed within the length of the heat conducting element when the support member is suspended by the pinching member. The heat conducting element can be pressure-sealed at an opposite end from the shell, and can be filled with a dielectric fluid.

As described earlier, the heat conducting element is positioned in a perforated wellbore section. A perforation in the context of oil wells refers to a hole punched in the casing or liner of an oil well to connect it to the reservoir. Creating a channel between the pay zone and the wellbore to cause oil and gas to flow to the wellbore easily, wherein the pay zone is a reservoir or a portion of the reservoir that contains economically producible hydrocarbons.

The perforations of the perforated wellbore section can be created using varying techniques. All perforating techniques are meant to obtain common objective; to have debris free perforations with maximum flow towards the wellbore. These techniques can include, but are not limited to, underbalance perforation, dynamic underbalance perforation, and overbalance perforation.

Underbalance is defined as the amount of pressure exerted on a formation exposed in a wellbore below the internal fluid pressure of that formation. If sufficient porosity and permeability exist, formation fluids enter the wellbore. The drilling rate typically increases as an underbalanced condition is approached. On the other hand, overbalance is defined as the amount of pressure (or force per unit area) in the wellbore that exceeds the pressure of fluids in the formation. The excess pressure is needed to prevent reservoir fluids (oil, gas, water) from entering the wellbore.

In underbalance perforation, the wellbore pressure, before perforation, is kept less than the formation reservoir pressure. As a result, with high permeability, the initial fluid influx in the tunnel helps in breaking the crushed zone loose and taking it out from the tunnel into the wellbore. As the reservoir pressure equalizes with bottomhole pressure, the rate of clean up decreases throughout the total number of perforations. Therefore, complete cleanup is based on the assumption that the wellbore pressure remains constant during perforation and cleanup process.

Dynamic underbalance perforating is a perforation technique in which a rapid underbalance is created during perforation, and helps in improving the optimal flow rate and the effective cleanup of the perforations. During conventional static underbalance perforation, the wellbore pressure fluctuates for a fraction of a second due to a high pressure wave generated by the detonation of the shaped charges. The pressure wave, reducing the rock mechanical strength, propagates through the rock matrix with a high variation of wellbore pressure forming the desired perforation tunnel. The high pressure wave causes the rock matrix to undergo tensile or shear failure around the perforation tunnel. Shear failure occurs when the tangential or hoop stress at the perforation wall reduces the material strength. The pressure gradient near the internal walls of the perforation becomes negative (due to the generation of underbalance pressure) and high enough, to exceed the tensile strength of the material, tensile failure occurs. Therefore pore pressure decreases, decompressing the reservoir fluid around the perforation wall and the present drawdown between the wellbore and reservoir pressure, allows the reservoir fluid to flow into the tunnel. The sudden reservoir fluid flow generated by the wellbore pressure less than the reservoir pressure is known as surge flow which causes the loose/weakened particles due to the rock failure and the charge debris in the tunnel to be displaced into the wellbore, cleaning the perforation tunnel.

Extreme Overbalanced (EOB) perforation is defined as applying a high wellbore pressure above the reservoir pressure during the perforating process or to existing perforations which is also known as EOB surging. The high overbalance which is significantly greater than the formation fracture point (FFP) initiates one or more small fractures around the perforated tunnel, and the fractures intersect with a network of fractures and allows more formation fluid into the tunnels.

The heat conducting element can be positioned in the perforated section differently in embodiments of the present disclosure. In one embodiment, the heat conducting element can be positioned in the perforated section with a protector that can be, but is not limited to, a mid-joint clamp, a cross coupling protector, and a low profile protector. The mid-joint clamp uses a compressive fit design to accommodate oversize or undersized tubing per API specifications and securely engages the cable or lines extending to the heat conducting element to the tubing. Field installation is quick and simple using our air driven hydraulic installation tools to compress the collars. The cross coupling protector uses a channel to shield cables or lines as they transition across the coupling to prevent damage during installation or retrieval of completions. The low profile protector uses a "compressive wave" design and as a result has a tighter tolerance range on the tubing string. The low profile protectors use channels to shield cables or lines as they transition across the coupling to prevent damage during installation or retrieval of completions.

The cross coupling protectors and the mid-joint clamps can be configured to be used with tubes that have an outer diameter within a range of 1.0 inches (in)-14.0 in, with a preferable range of 2.0 in-13.75 in. The mid-joint clamp and the cross coupling protector can be, but is not limited to, a bolt-up type and a pin-up type. Furthermore, the mid-joint clamp and the cross coupling protector can be, but is not limited to, being made of carbon steel or stainless steel casting bodies. Air driven hydraulic installation tools may be utilized when positioning the heat conducting element with the mid-joint clamps or the cross coupling protectors.

The heating element is preferably placed in direct contact with the rock. The heating element is perforated to allow for gas and hydrocarbon production. In one embodiment the heating element is a resistive heating element that is embedded in the matrix of the pipe that is perforated. As such when the pipe/tubing is perforated the heating element is concurrently perforated.

The heat transferred to the subterranean hydrocarbon reservoir is managed by applying an electrical current to a liquid condensation prevention system, wherein the electrical current is generated from at least one renewable energy source. The liquid condensation prevention system comprises the heat conducting element which is positioned in the wellbore located in the subterranean hydrocarbon reservoir. To utilize heat to improve a production rate of the subterranean hydrocarbon reservoir, the heat conducting element is connected to a producing end disposed in the subterranean hydrocarbon reservoir. Moreover, a recovery end is located outside the wellbore such that the production tubing is configured to pass gaseous natural gas resulting from the production process from the producing end of the production tubing, which is positioned within the subterranean hydrocarbon reservoir, to the recovery end of the production tubing, which is positioned outside the wellbore.

Since the heat conducting element is electrically coupled with the at least one renewable energy source, the heat emitted by the heat conducting element can be controlled by manipulating a set of energy source parameters which impacts the electrical output of the at least one renewable energy source. More specifically, the electrical output from the at least one renewable energy source affects the heating capabilities of the heat conducting element. If a solar cell is used when the at least one renewable energy source is solar energy, the set of energy source parameters can include, but is not limited to, an overall solar cell surface area, a voltage imposed across the solar cell, a photogenerated current, a parallel resistance, and a series resistance. Since the heat conducting element is in thermal communication with the subterranean hydrocarbon reservoir, the heat emitted from the heat conducting element impacts the overall phase behavior within the subterranean hydrocarbon reservoir since phase behavior is dependent on the temperature and the pressure within the subterranean hydrocarbon reservoir.

When the at least one renewable energy source is solar energy, the type of solar cell used to implement the method of the present disclosure can vary in different embodiments. The type of solar cell can be, but is not limited to, an amorphous Silicon solar cell (a-Si), a biohybrid solar cell, a cadmium telluride solar cell (CdTe), a concentrated photovoltaic (PV) cell (CVP), Copper indium gallium selenide solar cells (CI(G)S), a crystalline silicon solar cell (c-Si), a dye-sensitized solar cell (DSSC), a Gallium arsenide germanium solar cell (GaAs), a hybrid solar cell, a luminescent solar concentrator cell (LSC), a micromorph (tandem-cell using a-Si/µc-Si), a monocrystalline solar cell (mono-Si), a multi junction solar cell (MJ), a nanocrystal solar cell, an organic solar cell (OPV), a Perovskite solar cell, a photoelectrochemical cell (PEC), a plasmonic solar cell, a polycrystalline solar cell (multi-Si), a Quantum dot solar cell, a solid-state solar cell, thin-film solar cell (TFSC), a wafer solar cell, or a wafer-based solar cell crystalline.

Amorphous silicon (a-Si) is the non-crystalline form of silicon used for solar cells and thin-film transistors in liquid crystal displays. Used as semiconductor material for a-Si solar cells, or thin-film silicon solar cells, it is deposited in thin films onto a variety of flexible substrates, such as glass, metal and plastic. Amorphous silicon cells generally feature low efficiency, but are one of the most environmentally friendly photovoltaic technologies, since they do not use any toxic heavy metals such as cadmium or lead.

A biohybrid solar cell is a solar cell made using a combination of organic matter (photosystem I) and inorganic matter, wherein photosystem I (PSI, or plastocyanin-ferredoxin oxidoreductase) is the second photosystem in the photosynthetic light reactions of algae, plants, and some bacteria. PSI is used to recreate the natural process of photosynthesis to obtain a greater efficiency in solar energy conversion.

Cadmium telluride (CdTe) photovoltaics describes a photovoltaic (PV) technology that is based on the use of cadmium telluride, a thin semiconductor layer designed to absorb and convert sunlight into electricity. Cadmium telluride PV is the only thin film technology with lower costs than conventional solar cells made of crystalline silicon in multi-kilowatt systems.

Concentrator photovoltaics (CPV) (also known as concentration photovoltaics) is a photovoltaic technology that generates electricity from sunlight. Unlike conventional photovoltaic systems, it uses lenses or curved mirrors to focus sunlight onto small, highly efficient, multi junction (MJ) solar cells. In addition, CPV systems often use solar trackers and sometimes a cooling system to further increase their efficiency.

A copper indium gallium selenide solar cell (or CIGS cell, sometimes CI(G)S or CIS cell) is a thin-film solar cell used to convert sunlight into electric power. It is manufactured by depositing a thin layer of copper, indium, gallium and selenium on glass or plastic backing, along with electrodes on the front and back to collect current. Because the material has a high absorption coefficient and strongly absorbs sunlight, a much thinner film is required than of other semiconductor materials.

In order to monitor a phase behavior throughout a natural gas production span, temperature and pressure distribution are mapped for each grid block of a plurality of grid blocks, wherein the plurality of grid blocks spans across the subterranean hydrocarbon reservoir. The plurality of grid blocks is used to turn the geological model of the subterranean hydrocarbon reservoir into a discrete system on which fluid flow equations can be solved. The plurality of grids is determined according to the type of fluid displacement or depletion process modelled, past and anticipated field development, desired numerical accuracy, available software options, objectives of the simulation study, and other factors such as computer resources and time constraints. Cartesian and cylindrical are some of the common grid coordinate systems. The Cartesian coordinate system generates a 3-dimensional grid. Cylindrical coordinate systems, which use a radial system, are beneficial for near well studies dominated by radial inflow.

In the process of mapping temperature and pressure distribution, an internal pressure of the subterranean hydrocarbon reservoir, an internal pressure of the subterranean hydrocarbon reservoir, and a set of reservoir properties within the subterranean hydrocarbon reservoir are iteratively solved for convergence for a corresponding time step of a plurality of time steps, wherein the plurality of time steps represents the production span of the subterranean hydrocarbon reservoir. The set of reservoir properties can be, but is not limited to, a wellbore pressure, natural gas viscosity, a gas compressibility factor, thickness of the pay zone, subterranean hydrocarbon reservoir radius, heat capacity, rock density, gas density, thermal expansion factor, and thermal conductivity.

When solving for convergence, the corresponding time step is incremented to a subsequent time step of the plurality of time steps, if the internal pressure, the internal temperature, and the set of reservoir properties do not converge. At convergence, the internal pressure, the internal temperature, and the set of hydrocarbon properties are monitored, and the corresponding time step at convergence is identified as the final production time if the predetermined production rate is obtained. The final production time is dependent on an overall size of the subterranean hydrocarbon reservoir and a production rate of the subterranean hydrocarbon reservoir. Thus, the final production time can vary in different embodiments. In a preferred embodiment, the final production time is within a time range that can be, but is not limited to, 500 hours (hrs)-2000 hrs, 500 hrs-1750 hrs, with a preferable time range of 1000 hrs-1500 hrs. In particular, the internal temperature, the internal pressure, and the set of reservoir properties converge and the desired production rate is obtained within the time range of 1000 hrs-1500 hrs.

At convergence for the internal pressure, the internal temperature, and the set of hydrocarbon properties, and when the predetermined production rate is obtained, the method of the present disclosure searches for liquid condensation at the wellbore.

Figure 3A:
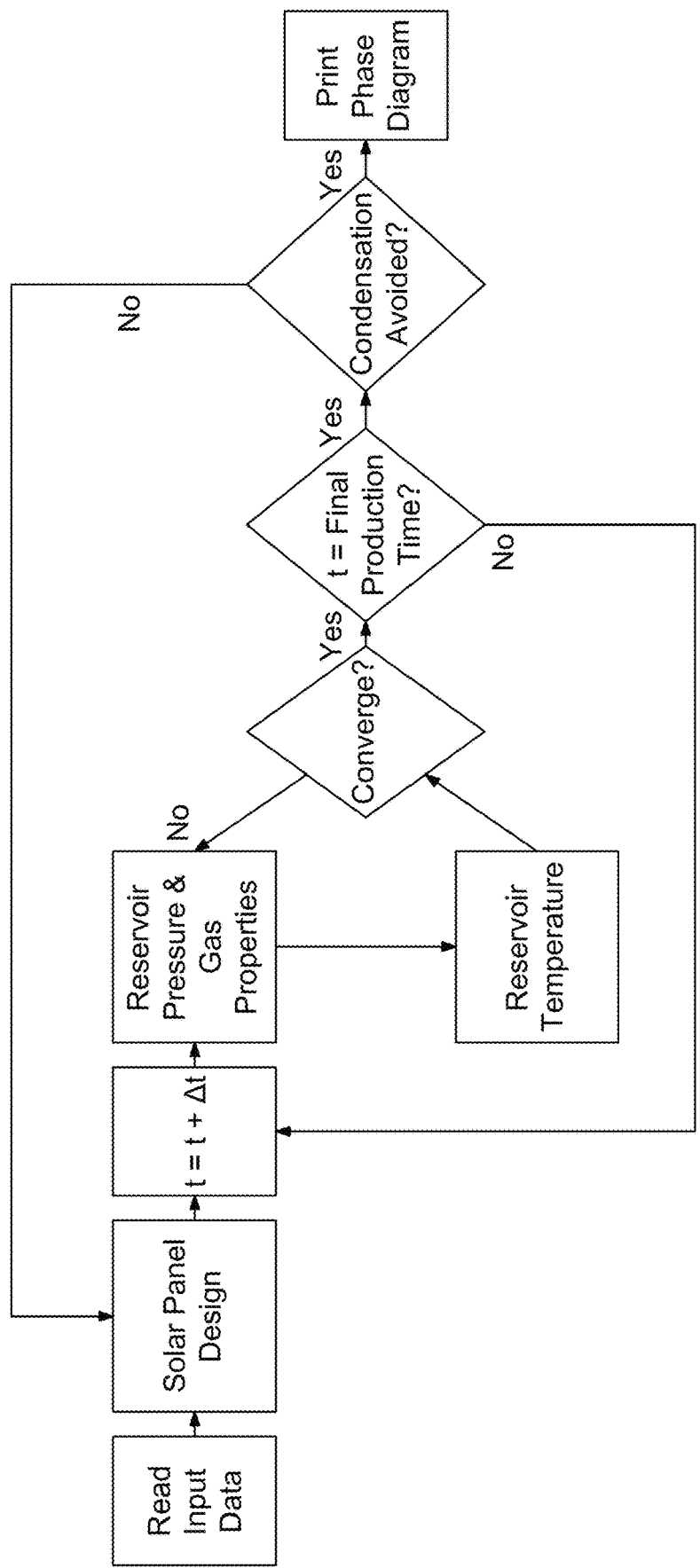
FIG. 3A is a flow chart illustrating the method of the present disclosure, wherein a process of printing a phase diagram is illustrated.

In a preferred embodiment of the present disclosure, in a process of detecting liquid condensation, the internal pressure and the internal pressure for each of the plurality of time steps is recorded. Next, as seen in FIG. 3A, in the process of detecting liquid condensation, a phase diagram is plotted using the internal temperature and the internal pressure for each of the plurality of time steps up to dew point. Since liquid condensation can be prevented by maintaining the internal temperature and the internal pressure above the dew point, the dew point can be used as a reference point in detecting liquid condensation. If liquid condensation is detected at the final production, the electric current applied to a liquid condensation prevention system is adjusted to heat the heat conducting element as required. The electric current can be adjusted by managing the at the at least one renewable energy source. In a preferred embodiment, a cubic-plus-association (CPA) equation of state is used to plot the phase diagram. However, in other embodiments of the present disclosure Van der Waals equation of state, Peng-Robinson equation of state, Peng-Robinson-Stryjek-Vera equations of state, and Elliott, Suresh, Donohue equation of state may be used.

Figure 3B:
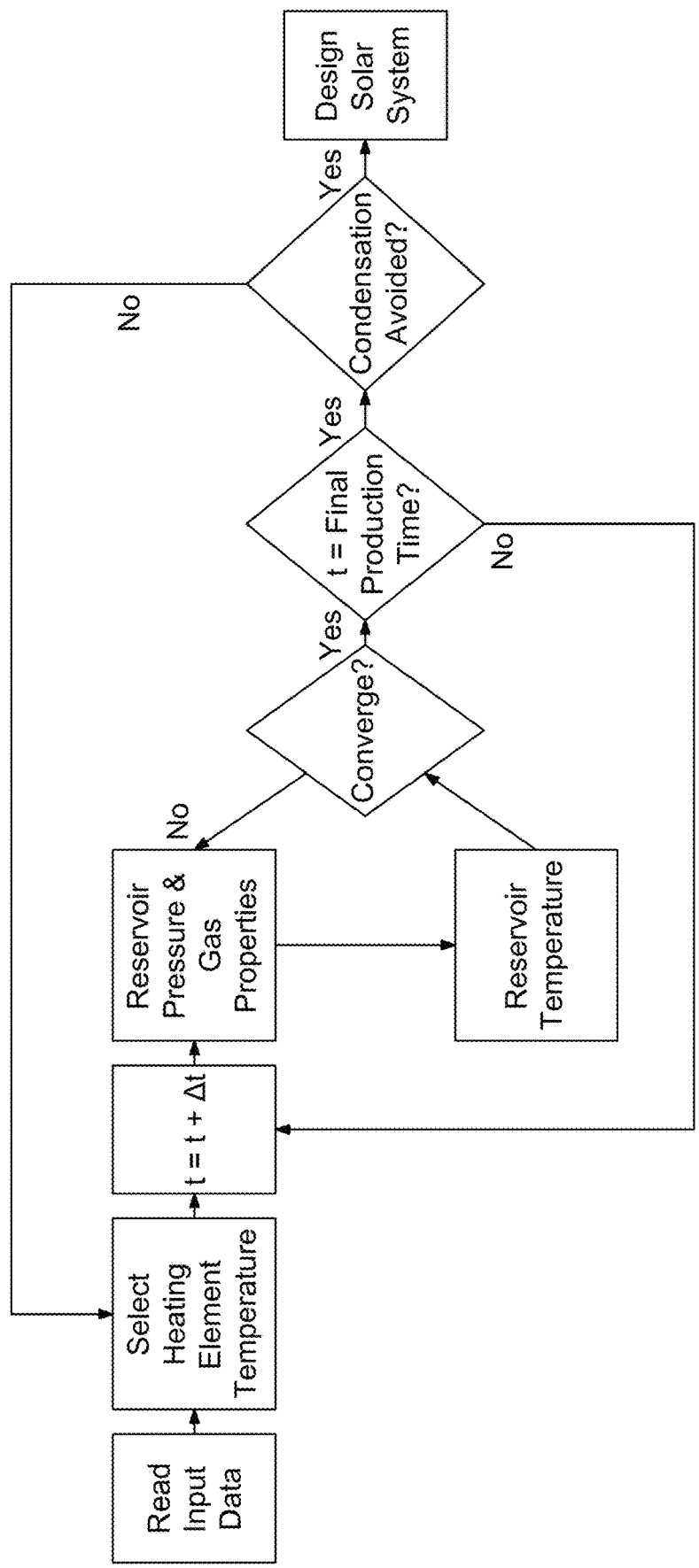
FIG. 3B is a flow chart illustrating the method of the present disclosure, wherein a process of designing a solar panel when the at least one renewable energy source is solar energy is illustrated.
Figure 5:
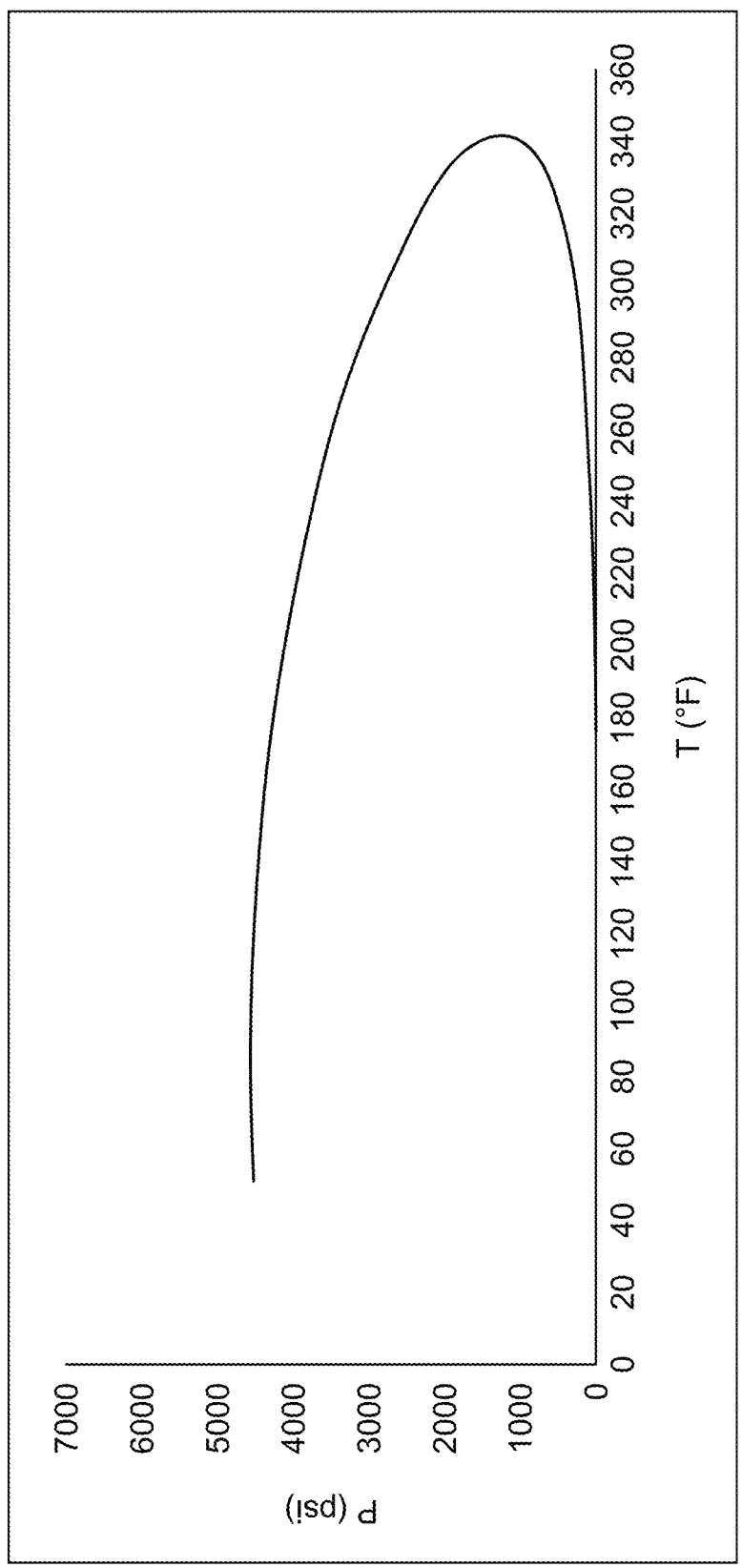
FIG. 5 is a phase diagram of a condensate fluid.

As seen in FIG. 3B, if liquid condensation is discovered, the heat emitted from the heat conducting element may be adjusted by manipulating the set of energy source parameters of the at least one renewable energy source. FIG. 5 is a phase diagram for the condensate fluid at different temperature values and different pressure values. A composition of the gas condensate is provided in the following table 1.

| Component | Mole Fraction |
|---|---|
| $N_2$ | 0.0300-0.0350 |
| $H_2S$ | 0.0045-0.0060 |
| $CO_2$ | 0.0160-0.0180 |
| $C_1$ | 0.8320-0.8340 |
| $C_2$ | 0.0510-0.0520 |
| $C_3$ | 0.0185-0.0200 |
| $n-C_4$ | 0.0065-0.0075 |
| $i-C_4$ | 0.0035-0.0045 |
| $n-C_5$ | 0.0025-0.0035 |

Where:
$N_2$—Nitrogen;
$H_2S$—Hydrogen Sulfide;
$CO_2$—Carbon Dioxide;
$C_1$—Methane;
$C_2$—Ethane;
$C_3$—Propane;
n-$C_4$—Normal Butane;
i-$C_4$—Isobutane;
n-$C_5$—Normal Pentane;

In a preferred embodiment of the method of the present disclosure, the electrical current is applied such that a temperature of the subterranean hydrocarbon reservoir at the producing end of the production tubing remains above a cricondentherm temperature of the natural gas, where the cricondentherm is the maximum temperature above at which a liquid cannot form. The cricondentherm, which is a property of the chemical composition of the gas condensate, can also be defined as the maximum temperature above which liquid cannot be formed regardless of the pressure. The cricondentherm temperature is determined through an equation of state such as the cubic-plus-association (CPA). In a preferred embodiment, the cricondentherm temperature is approximately within a range of 300 Fahrenheit (° F.)-500° F., 350° F.-400° F., 325-400° F., with a preferable temperature of approximately 350° F. Preferably, the temperature of the subterranean hydrocarbon reservoir at the producing end will be greater than a cricondentherm temperature of the gas composition in the geological formation by a temperature within a range of 50° F.-200° F., 75° F.-200° F., preferably 100° F.-150° F. greater than a cricondentherm temperature. By having the temperature at the producing end to be greater than the cricondentherm temperature, liquid condensation may be prevented. In a preferred embodiment, the temperature of the subterranean hydrocarbon reservoir at the producing end will be within a range of 450° F.-600° F., 500-600° F., with a preferred average temperature of approximately 572° F. The heat propagation from the heat conducting element is controlled by the thermal properties of a rock formation within the subterranean hydrocarbon reservoir and fluids within the subterranean hydrocarbon reservoir. In a preferred embodiment, a heat loss from the heat conducting element to adjacent rock formations is considered to be negligible and as described earlier, the heat is transferred via conduction and convection. Additionally, heat emitted from a produced fluid may also affect the overall heat propagation from the heat conducting element.

Figure 9:
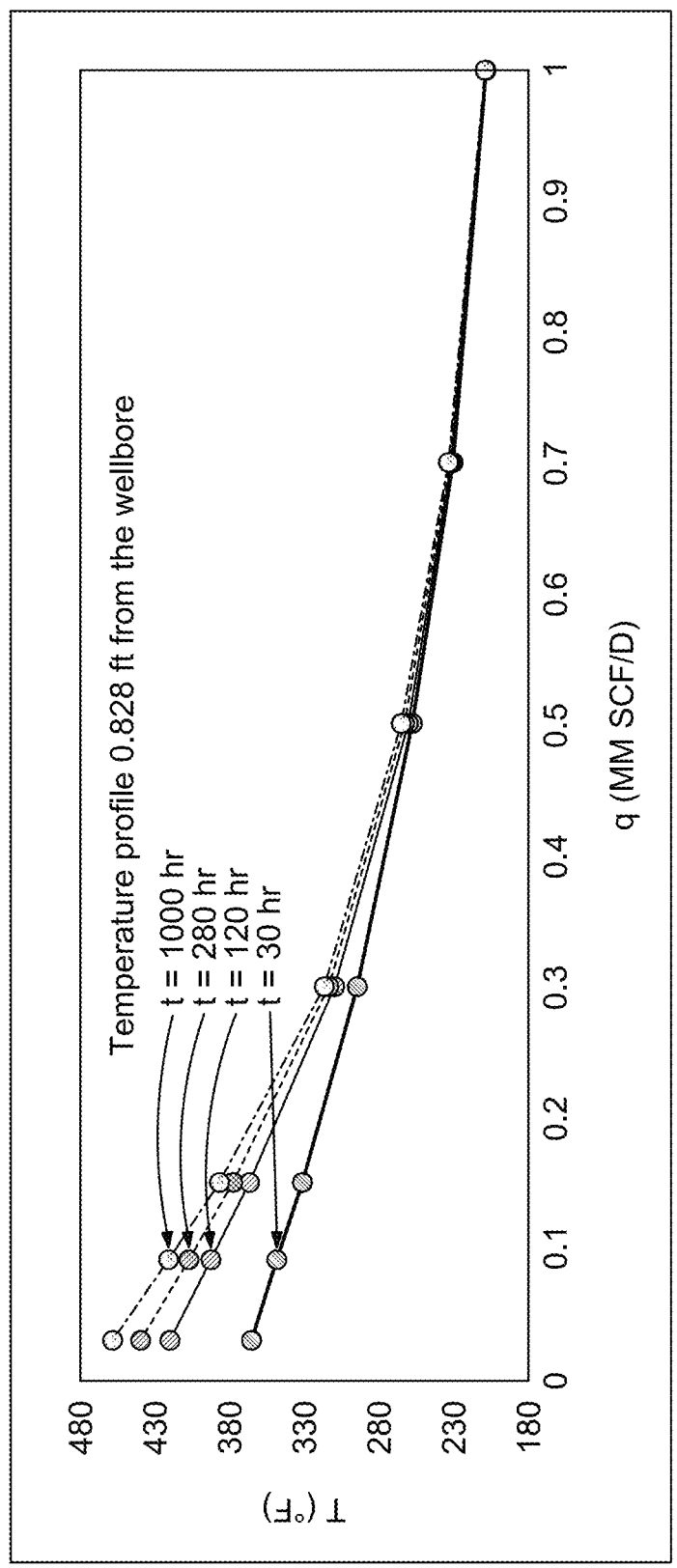
FIG. 9 is a heat profile as a function of flow rate at a distance of 0.828 feet from the wellbore at 30 hours, 120 hours, 280 hours, and 1000 hours.

A maximum efficiency of the subterranean hydrocarbon reservoir is achieved when the wellbore is heated under shut-in conditions. Generally, a reservoir is shut-in for well control purposes and the reservoir stops producing. The efficiency of the method of the present disclosure is measured by the extent of heat propagation, wherein the heat propagates from the heat conducting element to the rock formation. During natural gas production, the produced natural gas acts as a barrier of heat propagation as molecules travel in the opposite direction of heat transfer. In particular, the produced gas travels towards the wellbore and the heat from the heat conducting element propagates away from the wellbore. Convection at certain gas velocities can balance the conduction which limits the overall heat propagation. Exemplary gas velocities are shown in FIG. 9.

During natural gas recovery, three phases are generally performed. Namely, drilling with drill pipes, lining with casing, and production with tubing. When drilling with drill pipes, durable steel pipes that conduct the force onto a drill bit are used, and in many cases the drill pipe turns the drill bit. As a result, the drill bit cuts into the rock until deposits are reached. The last drill pipes before the drill bit are often nonmagnetic drill collars, especially in horizontal drilling. A drill collar is a component of the drill string that makes up part of the bottom hole assembly and are thicker-walled, heavier, and more rigid than drill pipes and are primarily used to weigh down the drill bit while dampening vibration and impact forces. Drill pipe grades include standard API grades (E-75, X-95, G-105, & S-135), as well as proprietary grades. The proprietary grades often exceed the specifications set forth by API SPEC 5DP, wherein API SPEC 5DP specifies the technical delivery conditions for steel drill-pipes with upset pipe-body ends and weld-on tool joints for use in drilling and production operations in petroleum and natural gas industries for three product specification levels (PSL-1, PSL-2 and PSL-3). PS-1 specifies wall thickness, impact strength, and yield strength requirements specific to the material grade. Specification levels PL-2/PL-3 have additional mandatory requirements.

The proprietary grades are developed for enhanced performance in sour service, critical service, and other user-defined requirements. Sour service grades resist sulfide stress corrosion (SSC). SSC can occur when hydrogen sulfide is present. Ingress of hydrogen coupled with higher stresses, low temperatures, low pH, and high chloride content decreases the ductility of steel grades leaving them susceptible to crack propagation and failure. Critical service grades resist corrosion when sweet gas or high concentrations of carbon dioxide are present, and also provide a cost effective alternative that is used in water injection applications.

The mud in contact with the drill bit cools the drill bit and carries the rock cuttings i.e. the cut rock back to the surface. The drill pipe used with the method of the present disclosure can be, but is not limited to, a standard drill type or a heavy weight drill pipe (HWDP).

Standard drill pipes are long tubular sections of pipe that make up the majority of the drill string. Each drill pipe is generally a 31 foot long section of tubular pipe but may be anywhere from 18 to 45 feet in length.

Heavy weight drill pipe (HWDP) is a tubular pipe that adds weight or acts as a transitional piece in the drill string. As a transitional section of the drill string, it is placed between the drill collar and standard drill pipe to reduce fatigue failures. In other applications, the HWDP is used as an additional weight to weigh down the drill string.

In a second phase, a wellbore lining process is performed. In particular, the lining process is performed with an outer tube which is referred to as the casing. Casing lines the wellbore and thus, protects the layers of soil and above all the groundwater from being contaminated by the drilling mud and/or fracking fluids. Lining also stabilizes the wellbore, so casing must be able to withstand especially high loads. The drilling and casing alternate—the drill string is taken out at specific intervals and the wellbore is lined with casing and cemented. The drilling continues after the cementing process. The casing type used can be, but is not limited to, conductor casing, surface casing, intermediate casing, production casing, liner, and liner tieback casing.

Conductor casing is set below the structural casing (i.e., drive pipe or marine conductor run to protect loose near-surface formations and to enable circulation of drilling fluid). The conductor isolates unconsolidated formations and water sands and protects against shallow gas. In general, the conductor casing is the casing string onto which a casing head is installed, wherein the casing string is long section of connected oilfield pipe that is lowered into a wellbore and cemented.

Surface casing is set to provide blowout protection, isolate water sands, and prevent lost circulation. Surface casing also often provides adequate shoe strength to drill into high-pressure transition zones, wherein show strength is the maximum pressure the wellbore can withstand with regard to the casing setting depth. In deviated wells, the surface casing may cover the build section to prevent keyseating of the formation during deeper drilling, wherein keyseating is a small diameter channel worn into the side of a larger diameter wellbore that can result in a change of direction of the wellbore. The surface casing string is typically cemented to the surface or to the mudline in offshore wells.

Intermediate casing is set to isolate unstable hole sections, lost-circulation zones, low pressure zones, and production zones. Intermediate casing is generally used in the transition zone from normal to abnormal pressure. A cement top of the intermediate casing is used to isolate any hydrocarbon zones.

Production casing is used to isolate production zones and contain formation pressures in the event of a tubing leak. Production casing may also be exposed to injection pressures from fracture jobs, gas lifts, and the injection of inhibitor oil. Gas lift is an artificial-lift method in which gas is injected into the production tubing to reduce the hydrostatic pressure of the fluid column.

Liner is a casing string that does not extend back to the wellhead, but is hung from another casing string. Liners are generally used instead of full casing strings to reduce cost, improve hydraulic performance when drilling deeper, allow the use of larger tubing above the liner top, and not represent a tension limitation for a rig.

Liner tieback is a casing string that provides additional pressure integrity from the liner top to the wellhead. An intermediate tieback is used to isolate a casing string that cannot withstand possible pressure loads, usually because of excessive wear or higher than anticipated pressures, if drilling is continued. Similarly, a production tieback isolates an intermediate string from production loads. Tiebacks can be un-cemented or partially cemented.

The production with tubing is the third phase associated with wellbore development. In this phase, tubing transports the oil and gas from deep in the well to the surface. Oil and gas occasionally rise to the surface without assistance. However, pumps are usually used to bring the fluids to the surface. When selecting the type of tubing, American Petroleum Institute (API) and International Organization for Standardization (ISO) standards are followed. In particular, API tubes having an outer diameter within a range of 1.050 inches-4.5 inches is preferably selected during the production process. For high-rate wells, tubing with an outer diameter larger than 4.5 inches may be used. Preferably, API steel is used. However, based on well conditions different tubing material that can be, but is not limited to, corrosion-resistant alloy (CRA) and thermoplastic tubing may be used.

Figure 6:
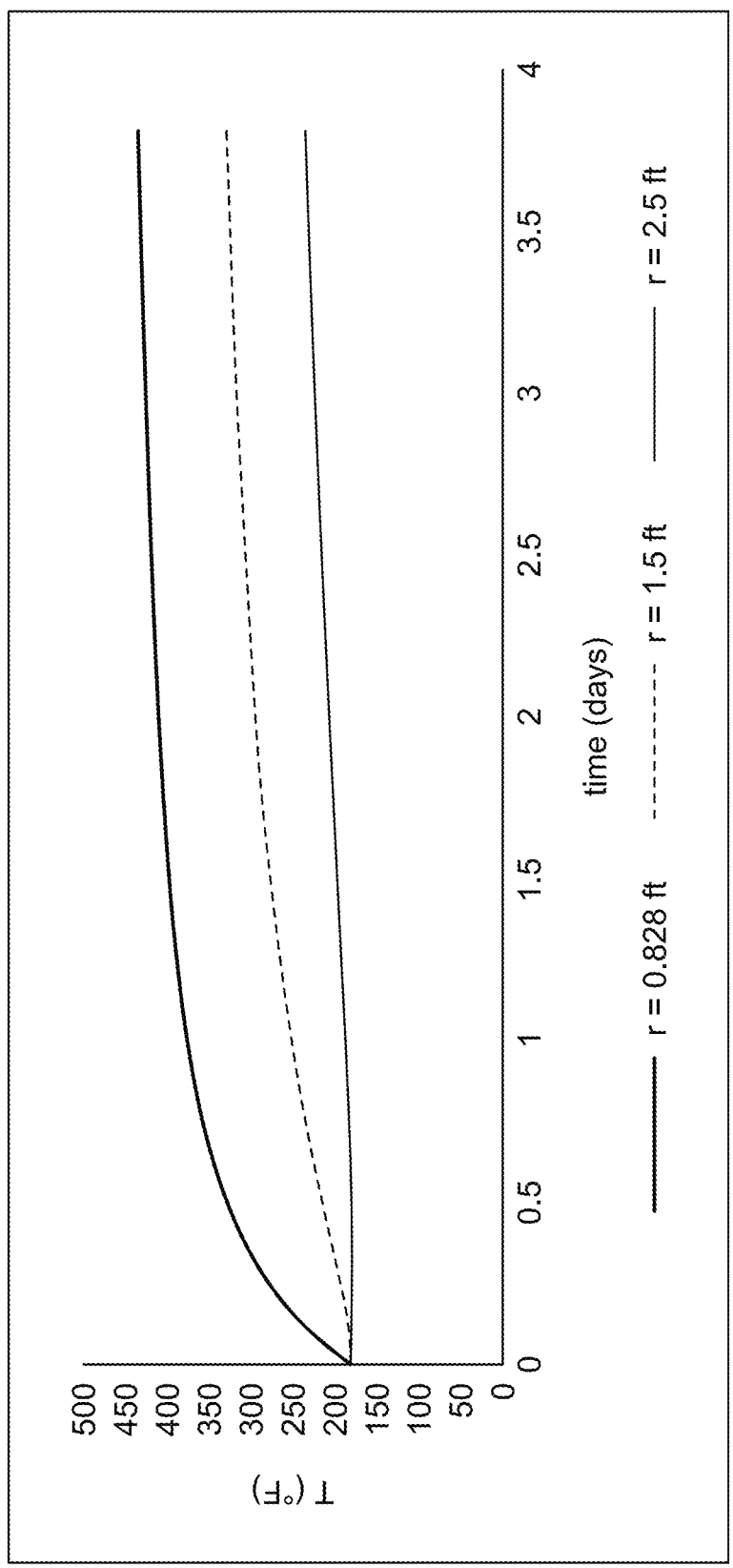
FIG. 6 is a graph illustrating the heat propagation inside the subterranean hydrocarbon reservoir as a function of time at different locations from the wellbore.

When the wellbore is heated during shut-in conditions, as shown in FIG. 6, simulations for the heat emitted from the heat conducting element revealed that the cricondentherm temperature can be achieved up to a distance that may be within a range of 0.5 feet (ft)-2.5 ft and 1.25 ft-2.0 ft with an average range of approximately 1.5 ft from the wellbore. The heat propagation during the shut-in reveals that shut-in heating is an effective method that may be used to remove condensate buildup from damaged subterranean hydrocarbon reservoirs.

Figure 7:
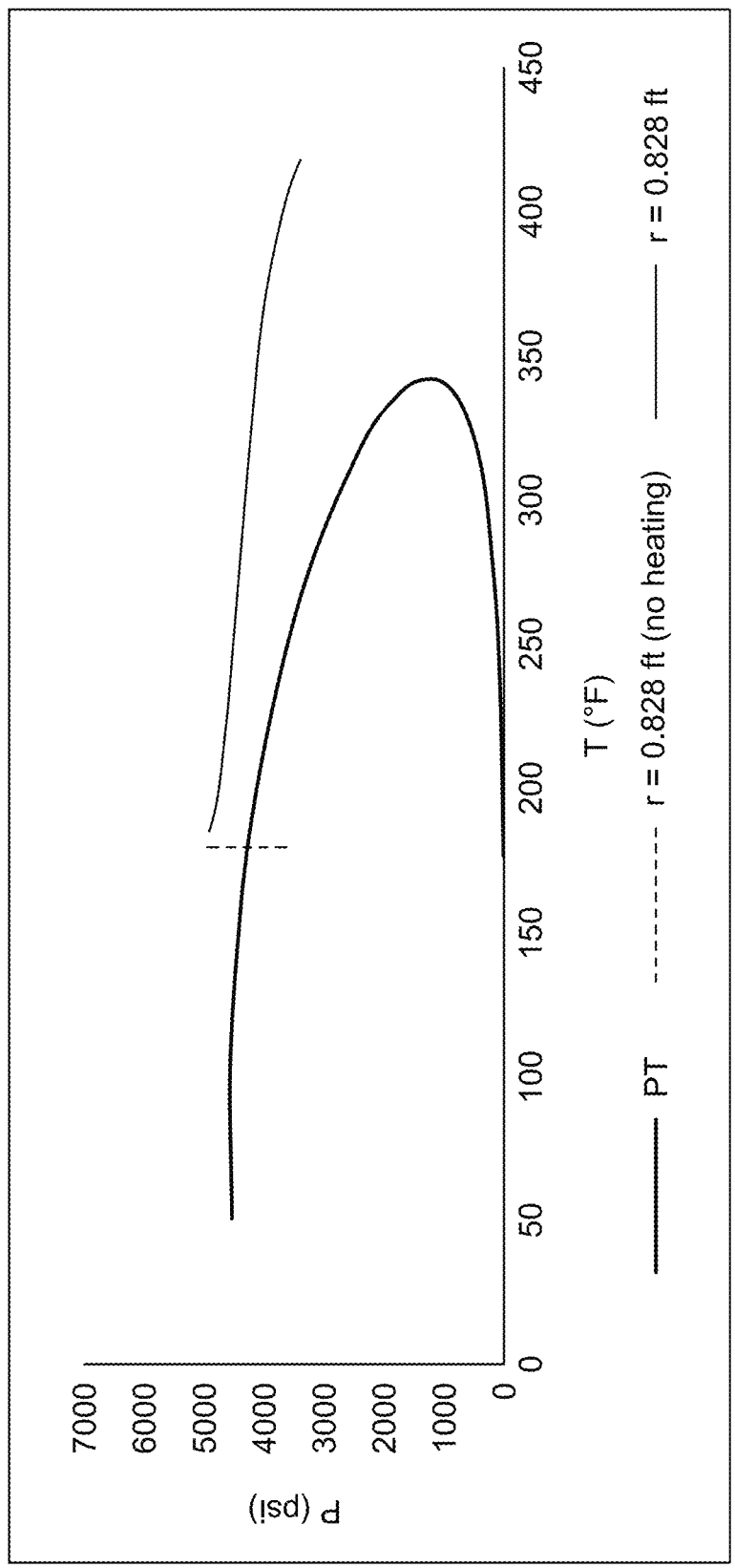
FIG. 7 is a pressure-temperature profile of the subterranean hydrocarbon reservoir when a heating source is used and when a heating source is not used.
Figure 8A:
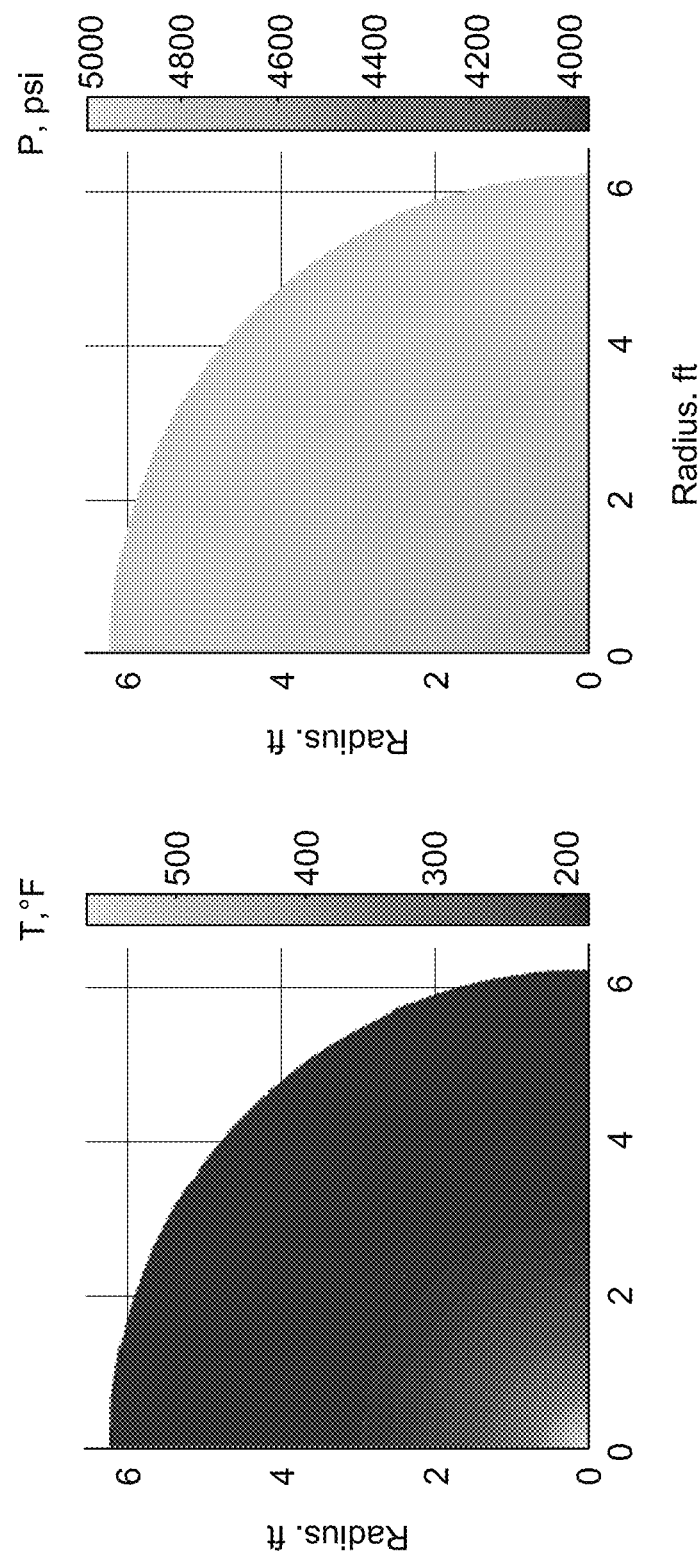
FIG. 8A is a mapping of pressure and temperature of a 6-feet area around the wellbore, wherein temperature and pressure profiles after 10 hours of production is illustrated.
Figure 8B:
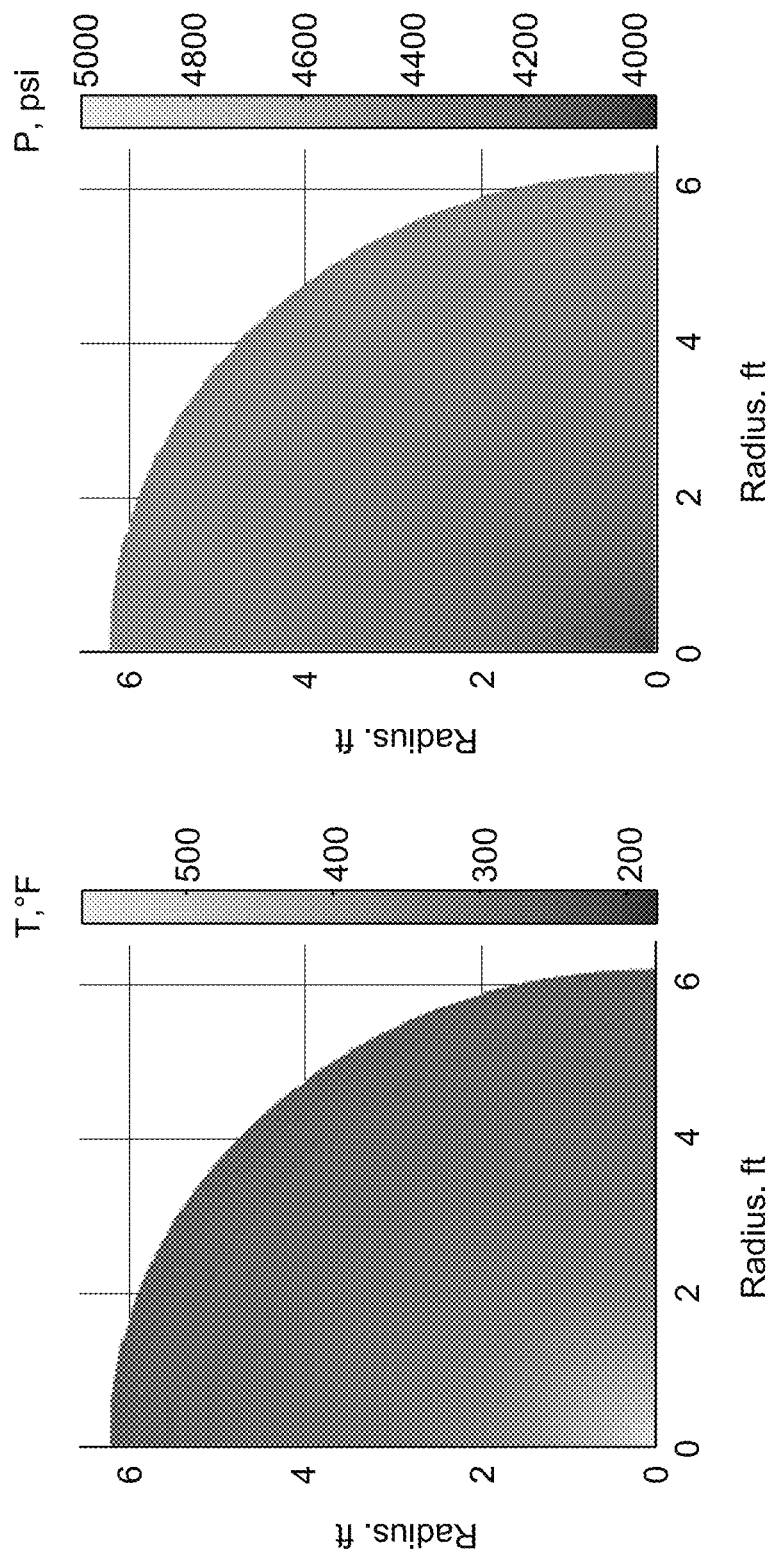
FIG. 8B is a mapping of pressure and temperature of a 6-feet area around the wellbore, wherein temperature and pressure profiles after 1000 hours of production is illustrated.

In contrast to shut-in conditions, when the wellbore is heated during a natural gas production process and when a drawdown pressure is within a range of 50 pounds per square inch (psi)-200 psi, 75 psi-150 psi with a preferable drawdown pressure of 100 psi, the subterranean hydrocarbon reservoir is depleted. More specifically, a drawdown pressure is a difference between a reservoir pressure and a wellbore pressure. In this instance, phase behavior is monitored as a function of distance from the wellbore. As shown in FIG. 7, temperature and a pressure at each grid block from the plurality of grid blocks is monitored and plotted until pseudosteady state is reached. Pseudosteady state flow is defined as a flow condition under which the pressure at any point in the reservoir declines at the same constant rate over time. Pseudosteady state occurs when there is boundary-dominated flow and the transient period ends. The boundary-dominated flow is a flow regime that starts when the drainage radius of the well reaches the reservoir boundaries. Boundary-dominated flow is a late-time flow behavior when the reservoir is in a state of pseudoequilibrium. As seen in FIG. 8A and FIG. 8B, temperature in an area adjacent the wellbore gradually increases as the pressure decreases such that a two phase region is avoided. In particular, in FIG. 8A, the temperature is low and the pressure is high in an area 6 ft from the wellbore after 10 hrs of production. In FIG. 8B, the temperature has risen and the pressure has lowered in the same 6 ft area around the wellbore after 1000 hrs of production. On the other hand, when heat is not provided by the heat conducting element, liquid condensation is detected around the wellbore.

In the subterranean hydrocarbon reservoir, the internal temperature, the internal pressure, and the set of reservoir properties are interdependent. Therefore, as described earlier, along with the internal temperature and the internal pressure, the set of reservoir properties is also iteratively solved for convergence. The set of reservoir properties can be, but is not limited to, the properties listed in table 2.

TABLE 2

| Reservoir properties | |
| --- | --- |
| Parameter | Value |
| $P_i$ (pounds per square inch (psi)) | 4900-5100 |
| $P_w$ (psi) | 75-125 |
| $T_i$ (Fahrenheit (° F.)) | 175-200 |
| $T_s$ (° F.) | 450-600 |
| $\mu$ (centipoise (cP)) | f1 (P, T) |
| z | f2 (P, T) |
| $r_R$ (feet (ft)) | 75-125 |
| $h_{pay}$ (ft) | 75-125 |
| $\rho_{rock}$ (Gram per cubic centimeter (g/cc)) | 2.5-3.0 |
| ø | 0.08-0.2 |
| k (Millidarcy (mD)) | 0.08-0.2 |

Figure 10:
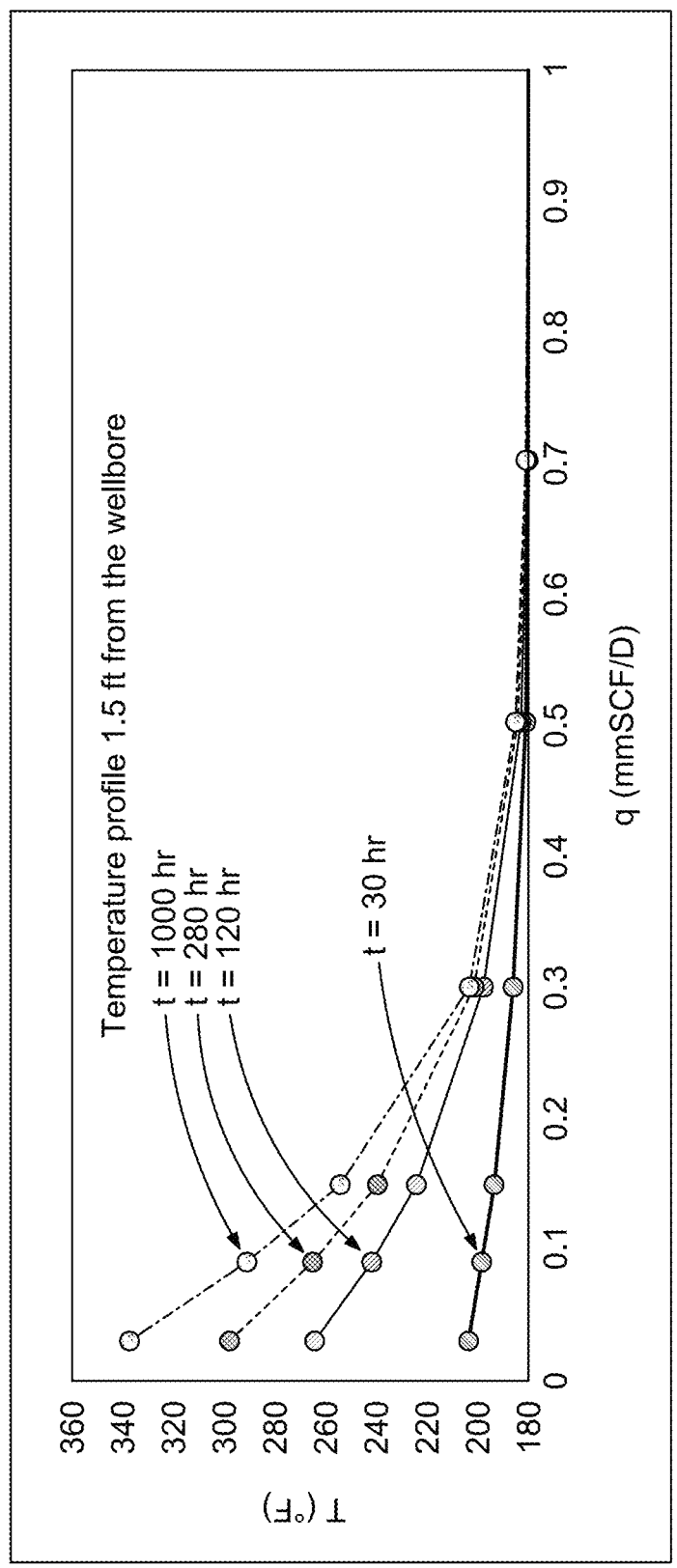
FIG. 10 is a heat profile as a function of flow rate at a distance of 1.5 feet from the wellbore at 30 hours, 120 hours, 280 hours, and 1000 hours.

Where:
$P_i$—Internal pressure of the subterranean hydrocarbon reservoir;
$P_w$—Wellbore pressure;
$T_i$—Internal temperature of the subterranean hydrocarbon reservoir;
$T_s$—Operating temperature of the heat conducting element;
$\mu$—Natural gas viscosity;
z—Gas compressibility factor;
$h_{pay}$—Thickness of pay zone;
$r_R$—Subterranean hydrocarbon reservoir radius;
$c_g$—Gas compressibility;
$c_t$—Total compressibility;

$C_P$—Heat capacity (Joule per gram (J/g));
$\rho_{rock}$—Rock density;
$\rho_g$—Gas density;
$\beta_T$—Thermal expansion factor (1/Kelvin (1/K));
$\kappa$—Thermal conductivity (watt per meter kelvin (W/m·K));
$\varnothing$—Porosity;
k—Permeability (mD);

The heat propagation is analyzed with the reservoir properties of table 2, wherein a heat profile is analyzed at a predetermined distance from the wellbore as a function of flow rate at different time intervals. The flow rate is the volume of gas that passes a particular point during a particular period of time. FIG. 9 is a heat profile as a function of the flow rate at a distance of 0.828 ft from the wellbore, wherein the heat profile is generated at 30 hrs, 120 hrs, 280 hrs, and 1000 hrsS. FIG. 10 is a heat profile as a function of the flow rate at a distance of 1.5 ft from the wellbore, wherein the heat profile is generated at 30 hrs, 120 hrs, 280 hrs, and 1000 hrs. From FIG. 9 and FIG. 10, a correlation between the heat propagation and the flow rate can be seen. In particular, as the flow rate exceeds 0.5 Million standard cubic feet per day (MMSCF/D) of gas flow (500,000 Standard cubic feet per day (SCF/D)), the heating efficiency drops significantly indicating convection controlled heat transfer of the produced fluids.

In a preferred embodiment, solar energy is used as the at least one renewable energy source and a solar cell is used to generate heat that is eventually emitted from the heat conducting element. Even though solar energy is utilized in a preferred embodiment, in another embodiment, wind energy, energy from biomass, and hydropower may be used as the at least one renewable energy source.

In order to have a complete model that expresses the process of transforming solar energy into heat, the solar energy model needs to be analyzed from the solar cell to the point where electrical energy is used for heating purposes. In the process of designing a power generation system with renewable energy sources, the intermittency associated with renewable energy sources need to be addressed as well.

Figure 11:
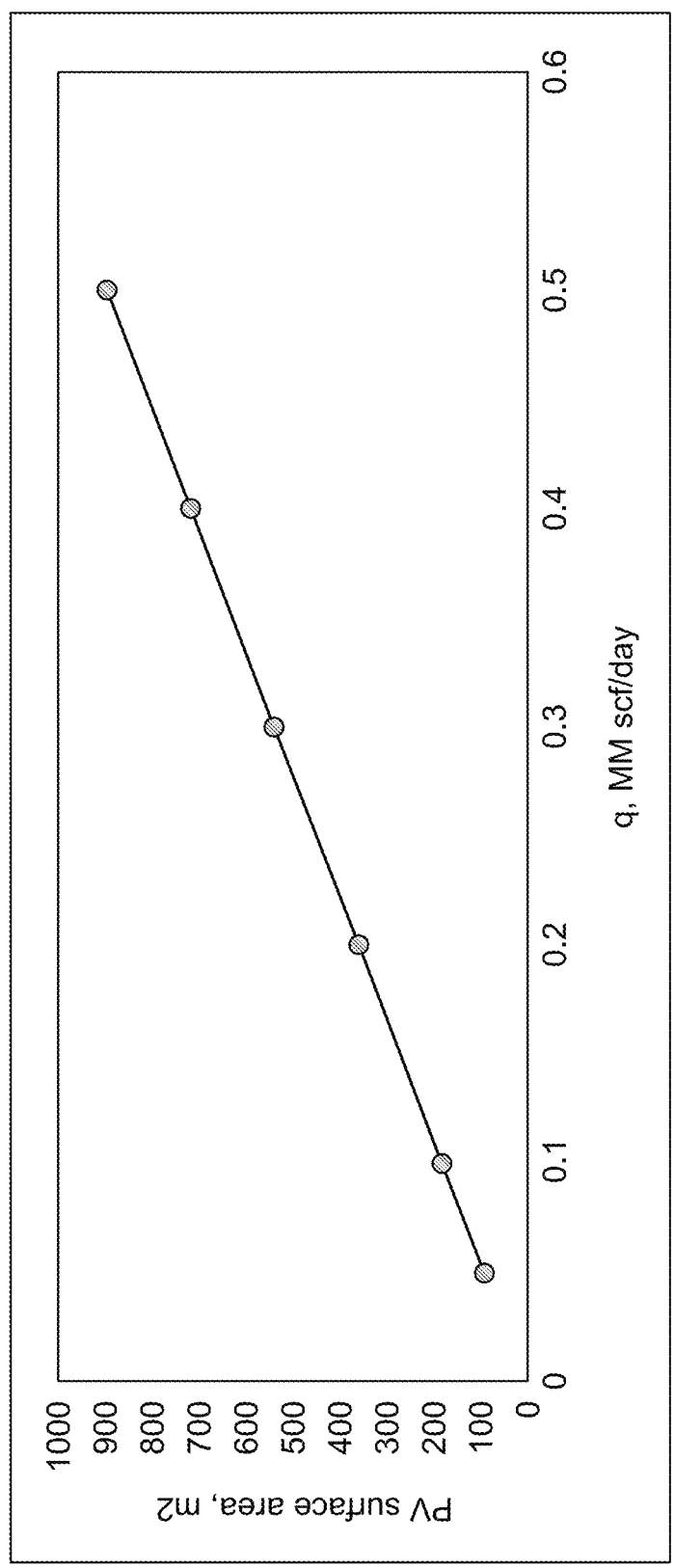
FIG. 11 is a graph illustrating a photovoltaic surface area variation as a function of gas production to maintain a downhole element temperature at 300—Centigrade (° C.) (572—Fahrenheit (° F.)).
Figure 12:
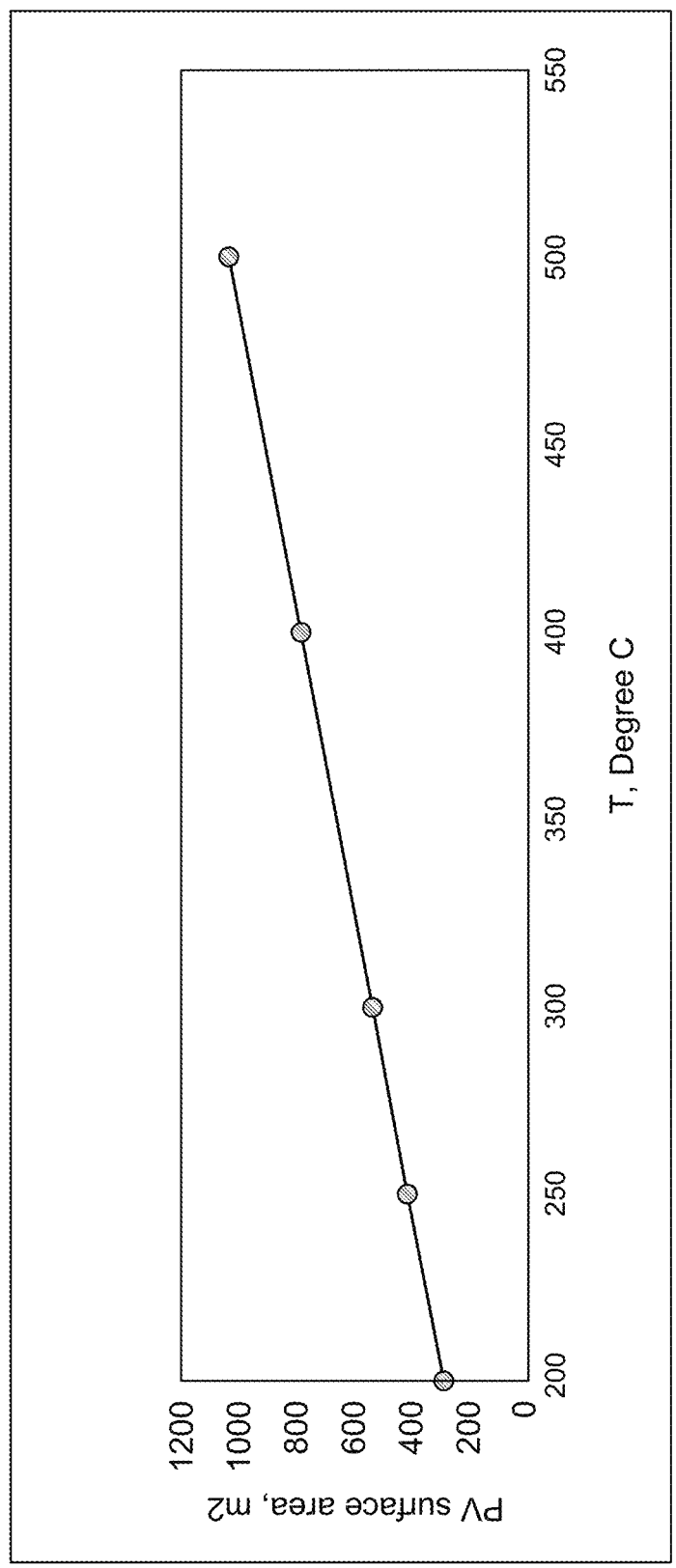
FIG. 12 is a graph illustrating a photovoltaic surface area requirement as a function of the downhole heating temperature for gas production at a flow rate of 0.3 Million standard cubic feet per day (MMSCF/D).

A surface area of the solar cell is dependent on a temperature required at the wellbore and a production rate of the subterranean hydrocarbon reservoir. As seen in FIG. 11, the surface area of the solar cell increases with the production rate. Furthermore, as seen in FIG. 12, the surface area of the solar cell increases with the temperature required at the wellbore. In particular, for higher temperatures to be generated at the wellbore, the heat conducting element, which provides heat at the wellbore, needs to receive a higher electrical load from the at least one renewable energy source. In a preferred embodiment, when the at least one renewable source is solar energy and a solar cell is utilized to generate the electrical output required by the heat conducting element, the surface area of the solar cell is increased. Since the total electrical output of the solar cell has a linear relationship with the surface area of the solar cell, increasing the surface area of the solar cell can generate the required electrical output. By adjusting the surface area, the temperature of the subterranean hydrocarbon reservoir at the producing end can be maintained to be higher than the cricondentherm temperatures such that liquid condensation may be avoided. Thus, the overall production rate can be affected by designing the solar cell according to the energy demands within the wellbore.

Figure 2:
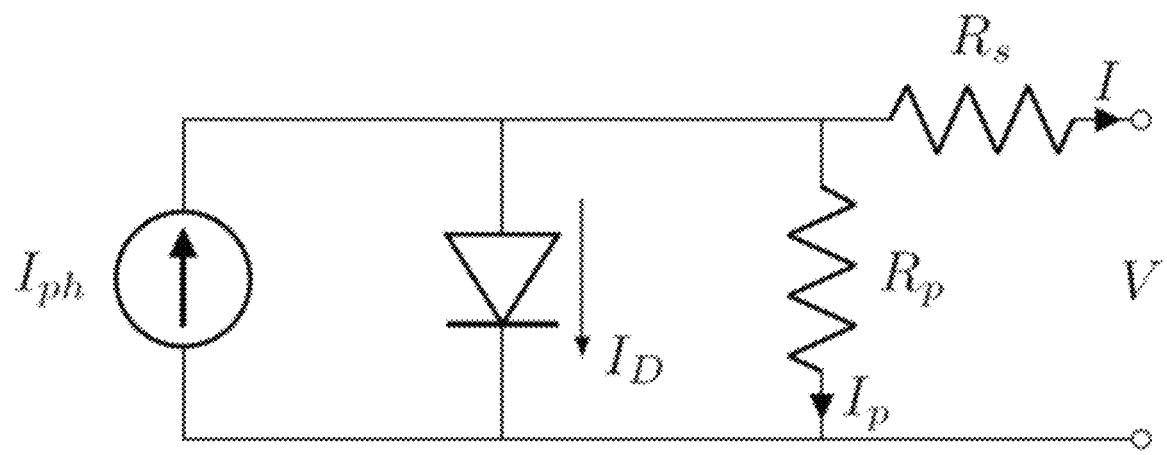
FIG. 2 is an illustration of a circuit diagram of a solar cell, wherein the at least one renewable energy source is solar energy.

Several methods can be used to model a solar cell. These models vary from being basic for quick and easy estimation of output power to very detailed and complicated models that evaluate the amount of energy produced by a photovoltaic (PV) panel. FIG. 2 is an example of a primary solar cell topology. See M. G. Villalva, J. R. Gazoli, and E. R. Filho, "Comprehensive approach to modeling and simulation of photovoltaic arrays," IEEE Transactions on Power Electronics, vol. 24, no. 5, pp. 1198-1208, 2009, incorporated herein by reference in its entirety.

$$T = I_{ph} - I_D - I_p \tag{1}$$

$$I_D = I_0\left[\exp\left(\frac{q(V + IR_s)}{kT_c}\right) - 1\right] - I_D - I_p \tag{2}$$

$$I_p = \frac{V + IR_s}{R_p} \tag{3}$$

Where:
k—Boltzmann's gas constant=$1.381 \times 10^{23}$ Joules per kelvin (J/K);
$T_c$—Absolute temperature of the solar cell (kelvin);
q—Electronic charge=$1.602 \times 10^{19}$ Joule/Volt (J/V);
V—Voltage imposed across the solar cell;
$I_0$—Saturation current;
$I_D$—Dark saturation current, wherein the dark saturation current is dependent on temperature;
$I_{ph}$—Photogenerated current;
$R_P$—Parallel resistance in ohms (Ω);
$R_S$—Series resistance (Ω);

Equations 1-3 were adjusted under two assumptions. A first assumption is that the shunt resistance is higher than a load resistance. A second assumptions is that the series resistance is considerably smaller than the load resistance. Thus, the load resistance and the series resistance can be considered to be negligible such that:

$$I = I_0\left[\exp\left(\frac{qV}{kT_c}\right) - 1\right] \tag{4}$$

See S. Kalogirou, Solar Energy Engineering: Processes and Systems. Elsevier Science, 2013; and J. Duffie and W. Beckman, Solar Engineering of Thermal Processes. Wiley, 2013, each incorporated herein by reference in their entirety.

The PV panel provides the short circuit current, the open circuit voltage, the maximum current, the maximum voltage, and the power, which eventually helps in circulating the generated total electric direct current (DC) power to supply heating elements.

When considering resistances, the parallel resistance, $R_p$, functions independent to the temperature. However, the parallel resistance behaves inverse to the solar radiation when configured as in FIG. 2.

$$R_p = R_{pref}\frac{G_{ref}}{G} \tag{5}$$

The solar cell temperature is represented by equation 6:

$$T_c = T_A + \left(\frac{NOCT - 20}{0.8}\right)G_T \tag{6}$$

See R. Messenger and A. Abtahi, Photovoltaic Systems Engineering, Third Edition. CRC Press, 2010, incorporated herein by reference in its entirety.

Where:
NOCT—Nominal operation cell temperature;
$G_{ref}$—Reference solar irradiance (Watt/square meter (W/m$^2$));
$G_T$—Solar irradiance;
$R_{pref}$—Reference parallel resistance under standard reference conditions;
$T_A$—Ambient temperature (Centigrade (° C.);
$T_c$—Solar cell temperature (° C.);
In a preferred embodiment,
$T_A$=20° C.;
$G_T$=800 W/m$^2$;
Air mass=1.5;
Wind speed<1.5 meters/second (m/s);

As a part of subsurface modelling, reservoir and wellbore temperature modelling have been investigated for a considerable time. Information extracted from such modelling processes is important to understand the fluid behavior during natural gas production process, injection, and reservoir shut-in processes. In a wellbore, temperature modelling and measurements can be used to determine factors that can be, but are not limited to, production locations, fracture heights, and transverse fracture numbers and locations. See Kunz, K. S. and Tixier, M. P. 1955. Temperature Surveys in Gas Producing Wells. SPE-472-G; Dawkrajai, P., Lake, L. W., Yoshioka, K. et al. 2006. Detection of Water or Gas Entries in Horizontal Wells from Temperature Profiles. Presented at the SPE/DOE Symposium on Improved Oil Recovery, Tulsa, 22-26 April. SPE-100050-MS. https://doi.org/10.2118/100050-MS; Yoshioka, K., Zhu, D., Hill, A. D. et al. 2007. Prediction of Temperature Changes Caused by Water or Gas Entry into a Horizontal Well. SPE Prod & Oper 22(4): 425-433. SPE-100209-PA. https://doi.org/10.2118/100209-PA; Agnew, B. G. (1966). Evaluation of fracture treatments with temperature surveys. Journal of Petroleum Technology, 18(07), 892-898. https://doi.org/10.2118/1287-PA; Davis, E. R., Zhu, D., and Hill, A. D. 1997. Interpretation of Fracture Height from Temperature Logs—The Effect of Wellbore/Fracture Separation. SPE Form Eval 12 (2): 119-124. SPE-29588-PA. https://doi.org/10.2118/29588-PA; and Li, X., & Zhu, D. (2018). Temperature Behavior During Multistage Fracture Treatments in Horizontal Wells. SPE Production & Operations, 33(03), 522-538. SPE-181876-PA https://doi.org/10.2118/181876-PA, each incorporated herein by reference in their entirety. Analytical models have been developed to estimate the fluid temperature in the wellbore. See Ramey, H. J. 1962. Wellbore Heat Transmission. J Pet Technol 14 (4): 427-435. SPE-96-PA. https://doi.org/10.2118/96-PA, incorporated herein by reference in its entirety. Analytical models have also been developed to simulate the reservoir temperature. See Terrill, R. M. 1965. Heat Transfer in Laminar Flow Between Parallel Porous Plates. International Journal of Heat and Mass Transfer 8(12): 1491-1497. https://doi.org/10.1016/0017-9310(65)90034-7; and Whitsitt, N. F. and Dysart, G. R. 1969. Effect of Temperature on Stimulation Design. Paper SPE 2497 presented at the Annual Fall Meeting of the Society of Petroleum Engineers of AIME, Denver, Colo., 28 September-1 October. SPE-2497-MS. https://doi.org/10.2118/2497-MS, each incorporated herein by reference in their entirety. Even though methods of estimating fluid temperature and methods of estimating reservoir temperature are useful, sophisticated models are required when addressing complex scenarios. See Yoshida, N., Hill, A. D., & Zhu, D. (2018). Comprehensive Modeling of Downhole Temperature in a Horizontal Well with Multiple Fractures. SPE Journal 23(05): 1580-1602. SPE-181812-PA. https://doi.org/10.2118/181812-PA, incorporated herein by reference in its entirety. Reservoir temperature modelling can be used to evaluate injected fluid rheology within a reservoir, formation cool down, acid reactivity, and temperature of produced fluids. Subsurface modelling can also be used to investigate the possibility of condensate accumulation as in the method of the present disclosure.

When utilizing solar panels for increasing the temperature around a wellbore, the solar panel design needs to be evaluated in order to generate the energy that results in the increase of temperature. In particular, a temperature needs to be high enough to avoid the formation of condensate banks that would form naturally due to near wellbore pressure drop. To fulfill the requirement, the metal section, which is the heat conducting element, may be positioned to perimetrically surround the wellbore. In another embodiment, the heat conducting element may be positioned within the wellbore. Thus, a constant source of heat is active during gas production. Moreover, a reservoir pressure and a reservoir temperature should be modelled to investigate if the gas remains above a dew point as the gas enters the wellbore.

A pressure profile may be generated by solving a diffusivity equation for compressible fluids. Generally, the pressure profile is obtained by substituting Darcy's law in the continuity equation in porous media. When gas is produced, near wellbore turbulence is likely to occur due to high gas velocity. Therefore, Forchheimer law is used instead to represent the turbulence, which is a non-Darcy flow. A pressure drop and fluid velocity can be represented by Forchheimer law with equation 7.

$$-\nabla p = \frac{\mu}{k}u + \beta\rho u^2 \qquad (7)$$

Where:
p—fluid pressure;
k—permeability;
ρ—density;
u—velocity;
β—Non-Darcy flow coefficient;
As seen in equation 8, equation 7 can be rearranged to replicate Darcy's law:

$$-\nabla p = \frac{\mu}{k_{nD}}u \qquad (8)$$

Where:
$k_{nD}$—Non-Darcy permeability, wherein the non-Darcy permeability can be estimated using equation 9.

$$k_{nD} = \frac{k}{1 + N_{Re,nD}} \qquad (9)$$

Where:
$N_{Re,nD}$—Non-Darcy Reynold number that can be expressed as:

$$N_{Re,nD} = \frac{\beta k \rho u}{\mu} \qquad (10)$$

According to the studies from Lee and Wattenbarger, the diffusivity equation in (11) radial form for compressible fluids can be represented as (see Lee, W. J. and Wattenbarger, R. A. 1996. Gas Reservoir Engineering, 5. Richardson, Tex.: Textbook Series, SPE):

$$\frac{1}{r}\frac{\partial}{\partial r}\left(rk_{nD}\frac{\partial m(p)}{\partial r}\right) = \varphi \mu c_t \frac{\partial m(p)}{\partial t}$$

Where:
m(p)—pseudopressure function;
φ—formation porosity;
$c_t$—total compressibility;
r—radial direction;
t—time;
Moreover, the pseudo pressure function can be expressed as in equation 12.

$$m(p) = 2\int_{p_b}^{p}\frac{p}{\mu z}dp \qquad (12)$$

To solve the partial differential equation of equation 11, the pressure is equated to the initial reservoir pressure before production starts. Moreover, a constant flow rate is assumed at the inner boundary condition, generating a Neumann boundary:

$$(\nabla p)_{wellbore} = -\frac{q_{sc}B_g\mu}{2\pi r_w h_{pay}k_{nD}} \qquad (13)$$

Where:
$q_{sc}$—Production rate at standard conditions;
$B_g$—Gas formation volume factor;
$r_w$—Wellbore radius;
$h_{pay}$—Pay zone thickness;
In deriving equation 13, a flow outer boundary condition is not implemented and can be expressed as:

$$n \cdot \nabla p = 0 \qquad (14)$$

Where:
N—normal vector to the boundary;
Gas compressibility factor is estimated by solving for the reduced gas density, $\rho_r$, which is shown in equation 15.

$$R_1\rho_r - \frac{R_2}{\rho_r} + R_3\rho_r^2 - R_4\rho_r^5 + R_5(1+A_{11}\rho_r^2)\rho_r^2 e^{-A_{11}\rho_r^2} = 0 \qquad (15)$$

Where:
$R_1$, $R_2$, $R_3$, $R_4$, and $R_5$—functions of pseudo-reduced temperature, $T_{pr}$, and pseudo-reduced temperature $P_{pr}$;
$A_{11}$—Constant;
Thus, the gas compressibility, Z, can be evaluated from the definition of reduced gas density:

$$\rho_r = \frac{0.27P_{pr}}{ZT_{pr}} \qquad (16)$$

Gas viscosity, which is pressure and temperature dependent, is estimated using the method given by equation 17.

$$\mu = 10^{-4}K\exp\left[X\left(\frac{\rho_g}{62.4}\right)^y\right] \qquad (17)$$

Where:

$$K = \frac{(9.4+0.02M_a)T^{1.5}}{209+19M_a+T} \qquad (18)$$

$$X = 3.5 + \frac{986}{T} + 0.01M_a \qquad (19)$$

$$Y = 2.4 - 0.2X \qquad (20)$$

$$\rho_g = \frac{pM_a}{ZRT} \qquad (21)$$

$$M_a = \sum_{i=1}^{n} M_i \qquad (22)$$

Where:
T—Temperature;
R—Universal gas constant;
$\rho_g$—Gas density;
$M_a$—Apparent molecular weight;
$M_i$—Component molecular weight;
n—Number of components;
The total compressibility can be assumed to be equal to the gas compressibility, $c_g$, wherein equation 22 is a representation of $c_g$.

$$c_g = \frac{1}{p} - \frac{1}{Z}\left(\frac{\partial Z}{\partial p}\right)_T \qquad (23)$$

The temperature profile can be solved by obtaining the pressure and velocity distributions. To do so, the energy balance equation is solved assuming one dimensional (1-D) heat transfer. (Li and Zhu 2018).

$$\overline{\rho\hat{C}_p}\frac{\partial T}{\partial t} - \varphi\beta_T T\frac{\partial p}{\partial t} + \rho_g\hat{C}_{pg}u\frac{\partial T}{\partial r} = \frac{1}{r}\frac{\partial}{\partial r}\left(\kappa r\frac{\partial T}{\partial r}\right) + (\beta_T T - 1)u\frac{\partial p}{\partial r} \qquad (24)$$

Where:

$$\overline{\kappa} = \varphi\kappa_g + (1-\varphi)\kappa_r \qquad (25)$$

$\beta_T$—Thermal expansion factor;
$\hat{C}_p$—Specific heat capacity;
$\overline{\kappa}$—Thermal conductivity;
g—Representation for gas;
r—Representation for rock;
In equation 24, the heat accumulation is represented by $$\overline{\rho\hat{C}_p}\frac{T}{\partial t} \text{ and } \phi\beta_T T\frac{\partial p}{\partial t}.$$

The heat accumulation is represented by $$\rho_g\hat{C}_{pg}u\frac{\partial T}{\partial r}.$$

The gas expansion effect is represented by $(\beta_T T-1)$ $$u \frac{\partial p}{\partial r}.$$

The differential equation is solved by applying the initial and boundary conditions. Initially, the temperature is equal to the reservoir temperature. An outer boundary temperature is assumed to be constant at reservoir temperature. The inner boundary condition can be specified as:

$$\kappa \frac{\partial T}{\partial \tau}\bigg|_w = U(T_e - T|_w) \quad (26)$$

Where:
U—Overall heat transfer coefficient;
$T_e$—Element temperature;
w—Representation of the wellbore;
The system of mass and heat equations are solved together to give mapping of pressure and temperature distributions in the reservoir.

As described earlier, in a different embodiment, wind energy may be used as the at least one renewable energy source. If wind energy is used as the at least one renewable energy source, a wind turbine may be used to convert wind energy into thermal energy directly using a heat generator based on the principle of the Joule machine. A heat generator based on this principle is a mixer installed into a tank filled with a heat transfer agent (liquid). The shaft of a mixer is rotated by a wind turbine and the liquid is mixed by an impeller. Due to friction among molecules of the mixing liquid, mechanical energy is converted into heat energy. The heated liquid then transfers heat to a heating system.

The efficiency of the system wind turbine—heat generator assembly depends on speed-torque characteristics of both elements of the system. The optimum performance of the system can be achieved when the speed-torque characteristic of a wind turbine operating at maximum power condition matches the characteristics of the heat generator.

For example, a wind turbine of the Savonius type, which is a vertical axis wind turbine, may be used in one embodiment. These wind turbines operate at a low speed that does not exceed a tip speed ratio (TSR). The amount of mechanical power produced by a wind turbine depends on the wind speed and the turbine parameters. In particular, the mechanical power produced by the wind turbine depends on the air density, power coefficient, wind speed, turbine blade area, turbine radius, and height of turbine rotor.

Generally, the heat generator includes a tank covered by thermal insulation, an impeller and a shaft connected to the wind turbine. The impeller is rotated by the wind turbine and the tank is filled with the heat transfer liquid. The power generated by the wind turbine depends on a density of the heat transfer liquid, an impeller diameter, a gravity constant, and a speed of the mixer shaft. Additionally, the power is also a function of the number of blades, the impeller blade width, width to diameter ratio, number of baffles, and the width of each of the baffles. Water is preferably chosen as a heat transfer agent.

In a different embodiment, the wind turbine can be connected to a generator that produces electricity. The electricity can then be used to generate heat at the wellbore. Different types of wind turbines that can be, but are not limited to, horizontal axis, vertical axis, and ducted wind turbines may be used in different embodiments.

In a horizontal axis wind turbine, the blades, the shaft, and the generator are on top of a tall tower, and the blades face into the wind. The shaft is horizontal to the ground. The wind hits the blades of the turbine that are connected to a shaft causing rotation. The shaft has a gear on the end which turns a generator. The generator produces electricity and sends the electricity into the power grid. The wind turbine also has some key elements that adds to efficiency. Inside a head of the wind turbine is an anemometer, wind vane, and controller that read the speed and direction of the wind. As the wind changes direction, a motor (yaw motor) turns the nacelle so the blades are always facing the wind. The power source also comes with a safety feature. In case of extreme winds the turbine has a break that can slow the shaft speed. To inhibit any damage to the turbine in extreme conditions.

In vertical axis turbines, the shaft the blades are connected to is vertical to the ground. The blades, the shaft, and the generator are positioned closer to the ground and the overall assembly of the vertical axis turbine is closer to the ground. The vertical axis wind turbines can be categorized as lift based and drag based.

Ducted wind turbines are generally positioned at the edge of a roof of a building and utilize the airflow along a side of the building. The air flows upwards, hugging the building wall then enters the front of the duct. Turbine blade diameter is usually around 600 mm.

Figure 13:
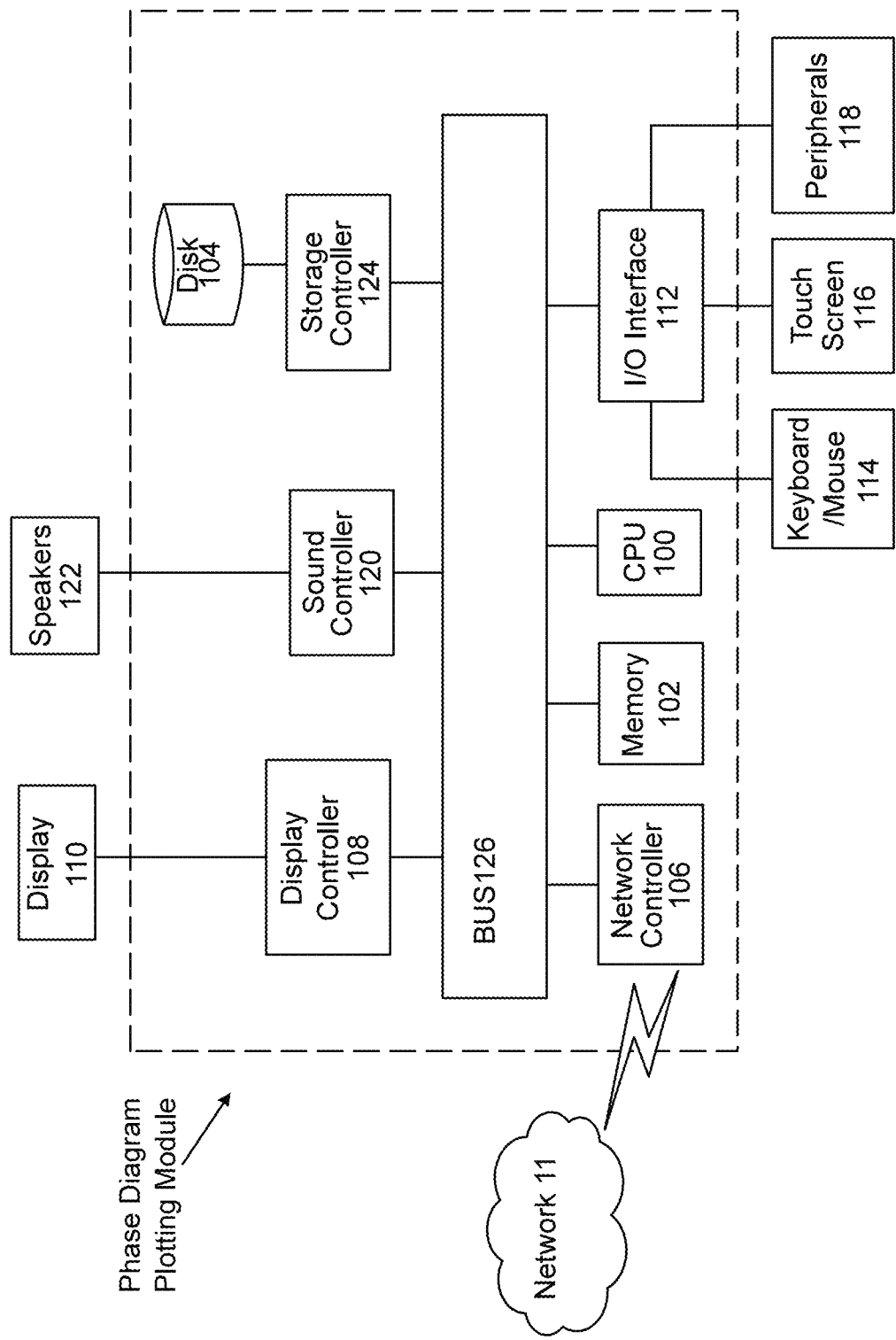
FIG. 13 is a schematic block diagram illustrating a hardware configuration of a phase diagram plotting module associated with a dew point determining process of the method of the present disclosure.

Next, a hardware description of the phase diagram plotting module according to exemplary embodiments is described with reference to FIG. 13. In FIG. 13, the phase diagram plotting module includes a CPU 100 which performs the processes described above/below. The process data and instructions may be stored in memory 102. These processes and instructions may also be stored on a storage medium disk 104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the phase diagram plotting module communicates, such as a server or computer.

Further, the claimed advancements may be provided as a utility application, background daemon, or component of an operating system, or combination thereof, executing in conjunction with CPU 100 and an operating system such as Microsoft Windows 7, UNIX, Solaris, LINUX, Apple MAC-OS and other systems known to those skilled in the art.

The hardware elements in order to achieve the phase diagram plotting module may be realized by various circuitry elements, known to those skilled in the art. For example, CPU 100 may be a Xenon or Core processor from Intel of America or an Opteron processor from AMD of America, or may be other processor types that would be recognized by one of ordinary skill in the art. Alternatively, the CPU 100 may be implemented on an FPGA, ASIC, PLD or using discrete logic circuits, as one of ordinary skill in the art would recognize. Further, CPU 100 may be implemented as multiple processors cooperatively working in parallel to perform the instructions of the inventive processes described above.

The phase diagram plotting module in FIG. 13 also includes a network controller 106, such as an Intel Ethernet PRO network interface card from Intel Corporation of America, for interfacing with network 11. As can be appreciated, the network 11 can be a public network, such as the Internet, or a private network such as an LAN or WAN network, or any combination thereof and can also include PSTN or ISDN sub-networks. The network 11 can also be wired, such as an Ethernet network, or can be wireless such as a cellular network including EDGE, 3G and 4G wireless cellular systems. The wireless network can also be WiFi, Bluetooth, or any other wireless form of communication that is known.

The phase diagram plotting module further includes a display controller 108, such as a NVIDIA GeForce GTX or Quadro graphics adaptor from NVIDIA Corporation of America for interfacing with display 110, such as a Hewlett Packard HPL2445w LCD monitor. A general purpose I/O interface 112 interfaces with a keyboard and/or mouse 114 as well as a touch screen panel 116 on or separate from display 110. General purpose I/O interface also connects to a variety of peripherals 118 including printers and scanners, such as an OfficeJet or DeskJet from Hewlett Packard.

A sound controller 120 is also provided in the phase diagram plotting module, such as Sound Blaster X-Fi Titanium from Creative, to interface with speakers/microphone 122 thereby providing sounds and/or music.

The general purpose storage controller 124 connects the storage medium disk 104 with communication bus 126, which may be an ISA, EISA, VESA, PCI, or similar, for interconnecting all of the components of the phase diagram plotting module. A description of the general features and functionality of the display 110, keyboard and/or mouse 114, as well as the display controller 108, storage controller 124, network controller 106, sound controller 120, and general purpose I/O interface 112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 14.

Figure 14:
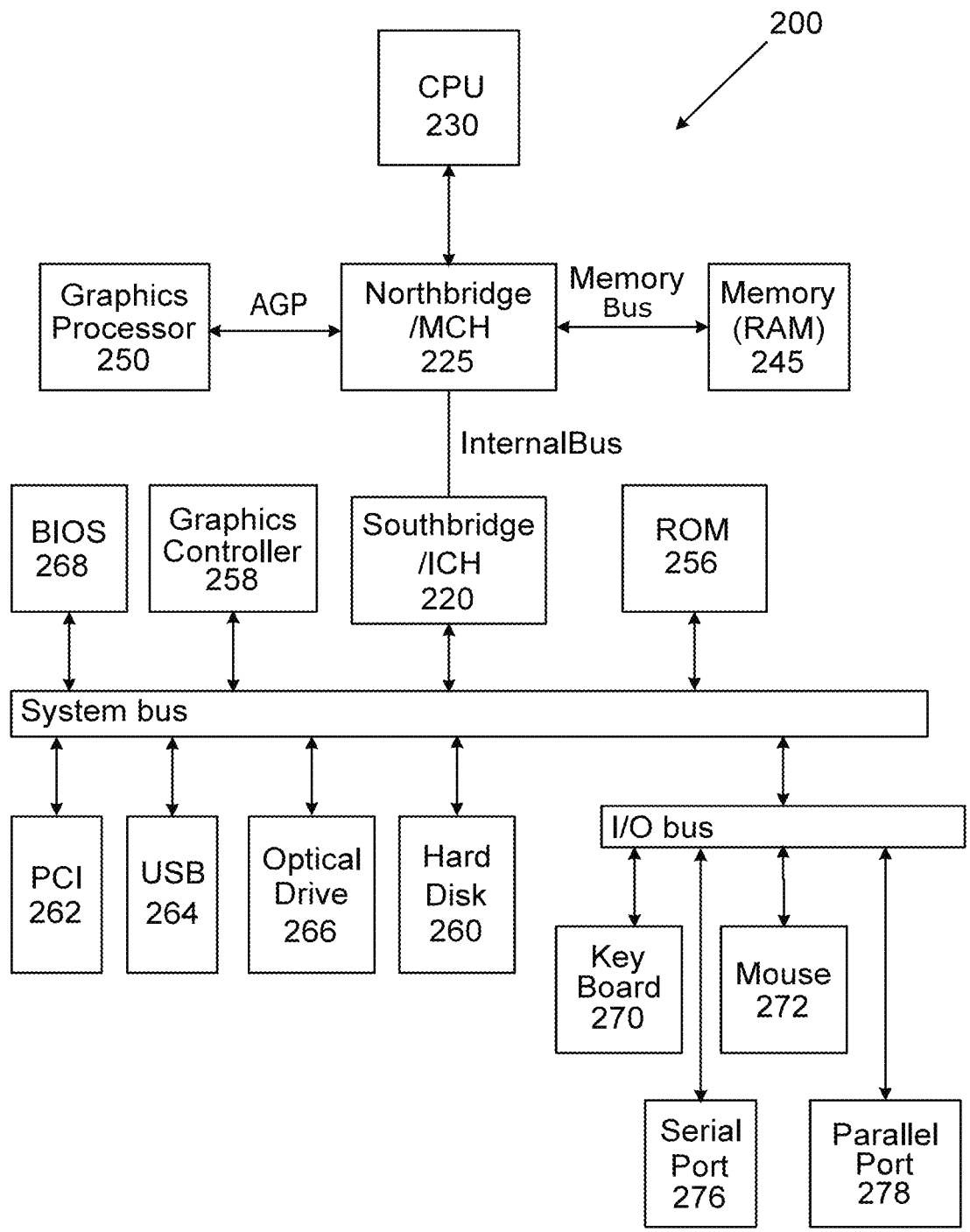
FIG. 14 is a schematic block diagram of a data processing system associated with the digitizing process of the method of the present disclosure.

FIG. 14 shows a schematic diagram of a data processing system, according to certain embodiments, for plotting the phase diagram. The data processing system is an example of a computer in which code or instructions implementing the processes of the illustrative embodiments may be located.

In FIG. 14, data processing system 200 employs a hub architecture including a north bridge and memory controller hub (NB/MCH) 225 and a south bridge and input/output (I/O) controller hub (SB/ICH) 220. The central processing unit (CPU) 230 is connected to NB/MCH 225. The NB/MCH 225 also connects to the memory 245 via a memory bus, and connects to the graphics processor 250 via an accelerated graphics port (AGP). The NB/MCH 225 also connects to the SB/ICH 220 via an internal bus (e.g., a unified media interface or a direct media interface). The CPU Processing unit 230 may contain one or more processors and even may be implemented using one or more heterogeneous processor systems.

Figure 15:
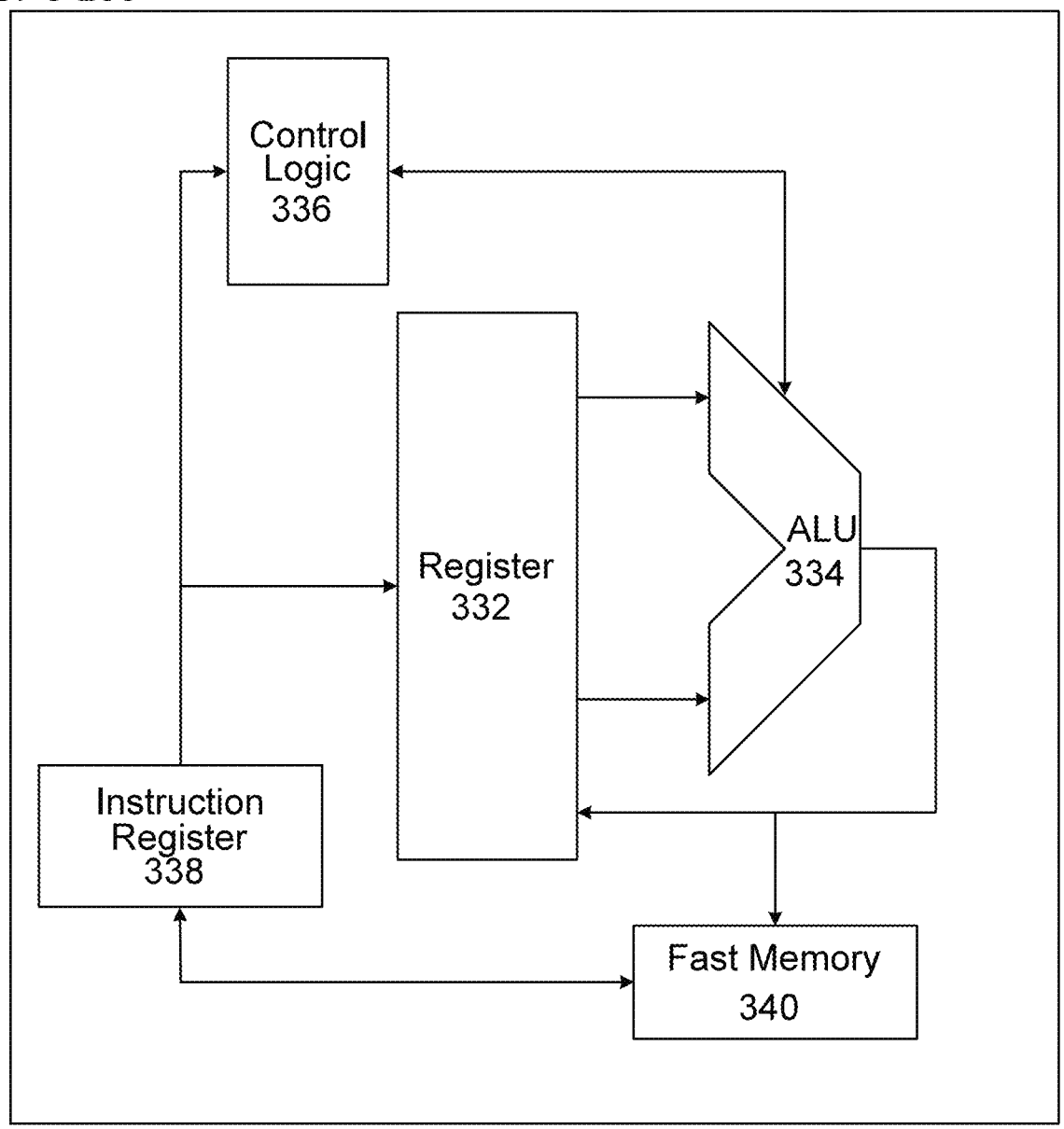
FIG. 15 is a schematic block diagram illustrating one implementation of a central processing unit associated with the phase diagram plotting process of the method of the present disclosure.

For example, FIG. 15 shows one implementation of CPU 230. In one implementation, the instruction register 338 retrieves instructions from the fast memory 340. At least part of these instructions are fetched from the instruction register 338 by the control logic 336 and interpreted according to the instruction set architecture of the CPU 230. Part of the instructions can also be directed to the register 332. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 334 that loads values from the register 332 and performs logical and mathematical operations on the loaded values according to the instructions. The results from these operations can be feedback into the register and/or stored in the fast memory 340. According to certain implementations, the instruction set architecture of the CPU 230 can use a reduced instruction set architecture, a complex instruction set architecture, a vector processor architecture, a very large instruction word architecture. Furthermore, the CPU 230 can be based on the Von Neuman model or the Harvard model. The CPU 230 can be a digital signal processor, an FPGA, an ASIC, a PLA, a PLD, or a CPLD. Further, the CPU 230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 14, the data processing system 200 can include that the SB/ICH 220 is coupled through a system bus to an I/O Bus, a read only memory (ROM) 256, universal serial bus (USB) port 264, a flash binary input/output system (BIOS) 268, and a graphics controller 258. PCI/PCIe devices can also be coupled to SB/ICH 220 through a PCI bus 262.

The PCI devices may include, for example, Ethernet adapters, add-in cards, and PC cards for notebook computers. The Hard disk drive 260 and CD-ROM 266 can use, for example, an integrated drive electronics (IDE) or serial advanced technology attachment (SATA) interface. In one implementation the I/O bus can include a super I/O (SIO) device.

Further, the hard disk drive (HDD) 260 and optical drive 266 can also be coupled to the SB/ICH 220 through a system bus. In one implementation, a keyboard 270, a mouse 272, a parallel port 278, and a serial port 276 can be connected to the system bust through the I/O bus. Other peripherals and devices that can be connected to the SB/ICH 220 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 16:
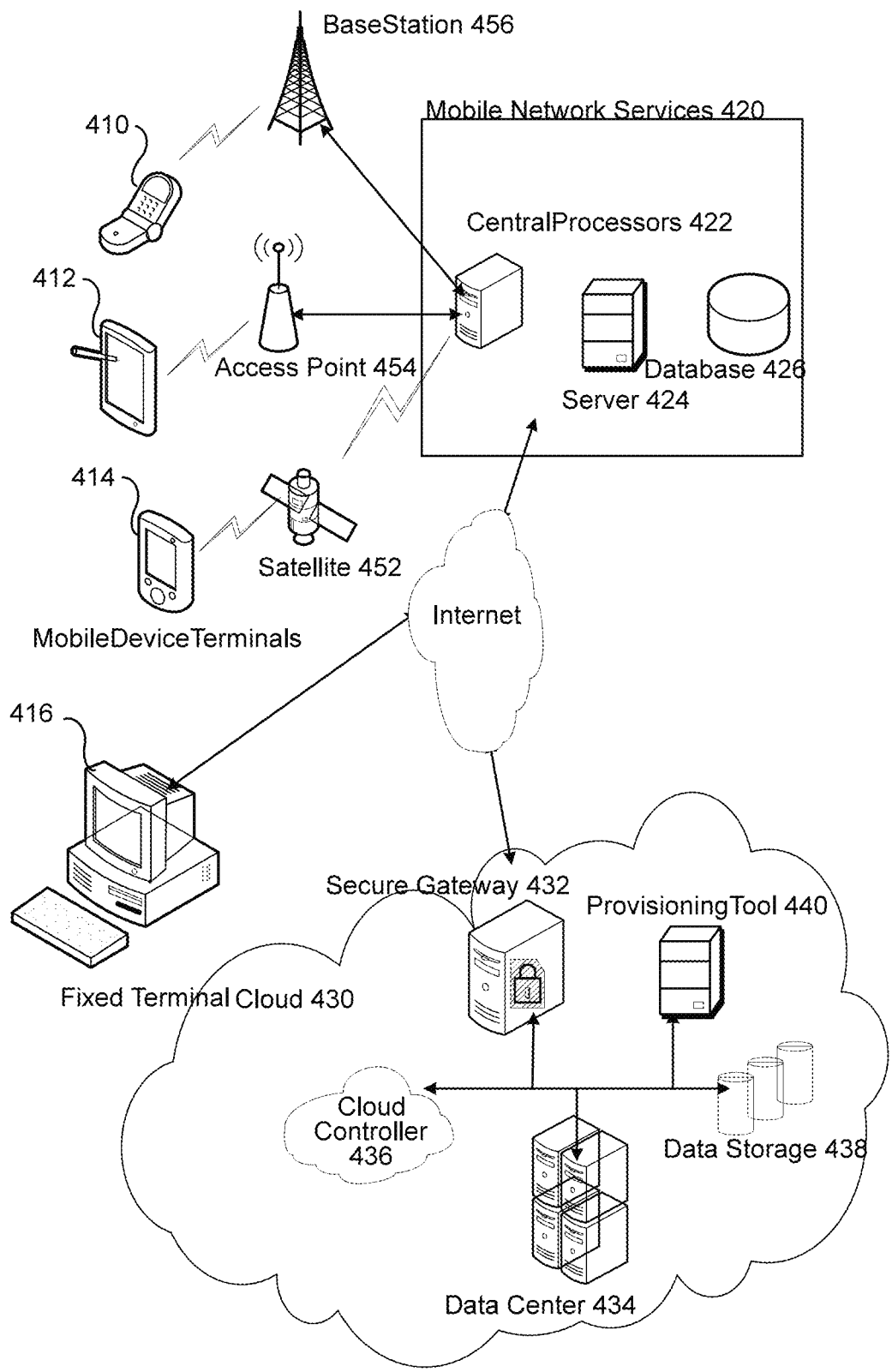
FIG. 16 is a schematic block diagram illustrating the process of utilizing multiple processors distributed across a network for the phase diagram plotting process.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 16, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Terminology used herein is for the purpose of describing particular embodiments only and is not intended to be limiting of the invention.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all subranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of recovering natural gas from a subterranean hydrocarbon reservoir, comprising:
   applying an electrical current to a liquid condensation prevention system to heat a heat conducting element, wherein the electrical current is generated from at least one renewable energy source,
   wherein the liquid condensation prevention system comprising:
   the heat conducting element being positioned within a wellbore located in the subterranean hydrocarbon reservoir, wherein the heat conducting element is connected to a production tubing having a producing end disposed in the subterranean hydrocarbon reservoir and a recovery end located outside the wellbore, and wherein the production tubing is configured to pass gaseous natural gas from the producing end of the production tubing in the subterranean hydrocarbon reservoir to the recovery end of the production tubing outside the wellbore;
   the heat conducting element being electrically coupled with the at least one renewable energy source;

the heat conducting element being in thermal communication with the subterranean hydrocarbon reservoir;

applying the electrical current such that a temperature of the subterranean hydrocarbon reservoir at the producing end of the tubing remains above a cricondentherm temperature of the natural gas, wherein the cricondentherm temperature is determined using an equation of state, wherein the equation of state is a cubic-plus-association (CPA);

monitoring a production rate of the subterranean hydrocarbon reservoir to identify a final production time, wherein the production rate matches a predetermined production rate at the final production;

adjusting the temperature of the subterranean hydrocarbon reservoir at the producing end to prevent liquid condensation at the final production time by adjusting the electrical current from the at least one renewable energy source; and recovering the natural gas from the subterranean hydrocarbon reservoir.

2. The method of recovering natural gas from a subterranean hydrocarbon reservoir as of claim 1, wherein the at least one renewable energy source is solar energy and the solar energy is received by a solar cell, wherein a shunt resistance a greater than a load resistance of the solar cell, wherein a load resistance is greater than a series resistance of the solar cell.

3. The method of recovering natural gas from a subterranean hydrocarbon reservoir as of claim 1, wherein the at least one renewable energy source is solar energy, wherein a surface area of a solar cell used in generating solar energy is proportional to a production rate of the subterranean hydrocarbon reservoir.

4. The method of recovering natural gas from a subterranean hydrocarbon reservoir as of claim 1, wherein the at least one renewable energy source is solar energy, wherein a surface area of a solar cell used in generating solar energy is proportional to the temperature of the subterranean hydrocarbon reservoir at the producing end.

5. The method of recovering natural gas from a subterranean hydrocarbon reservoir as of claim 1, wherein the final production time is dependent on an overall size of the subterranean hydrocarbon reservoir.

6. The method of recovering natural gas from a subterranean hydrocarbon reservoir as of claim 1, wherein the heat conducting element is a metal section perimetrically surrounding the wellbore.

7. The method of recovering natural gas from a subterranean hydrocarbon reservoir as of claim 1, wherein the heat conducting element transfers heat via conduction and convection.

8. The method of recovering natural gas from a subterranean hydrocarbon reservoir as of claim 1, wherein the at least one renewable energy source is wind energy.

9. The method of recovering natural gas from a subterranean hydrocarbon reservoir as of claim 1, wherein the heat conducting element is at least one electric heating cable vertically suspended into the wellbore.

* * * * *